US012307892B2

(12) United States Patent
Jang et al.

(10) Patent No.: US 12,307,892 B2
(45) **Date of Patent: *May 20, 2025**

(54) CLOUD-BASED STOP-AND-GO MITIGATION SYSTEM WITH MULTI-LANE SENSING

(71) Applicant: TOYOTA MOTOR ENGINEERING & MANUFACTURING NORTH AMERICA, INC., Plano, TX (US)

(72) Inventors: Kathy Jang, San Jose, CA (US); Yashar Zeiynali Farid, Mountain View, CA (US); Kentaro Oguchi, Mountain View, CA (US)

(73) Assignees: TOYOTA MOTOR ENGINEERING & MANUFACTURING NORTH AMERICA, INC., Plano, TX (US); TOYOTA JDOSHA KABUSHIKI KAISHA, Toyota (JP)

( * ) Notice: Subject to any disclaimer, the term of this patent is extended or adjusted under 35 U.S.C. 154(b) by 291 days.

This patent is subject to a terminal disclaimer.

(21) Appl. No.: 17/943,917

(22) Filed: Sep. 13, 2022

(65) Prior Publication Data

US 2024/0087453 A1 Mar. 14, 2024

(51) Int. Cl.

*G08G 1/0967* (2006.01)
*G08G 1/01* (2006.01)
*G08G 1/052* (2006.01)

(52) U.S. Cl.

CPC ..... *G08G 1/096725* (2013.01); *G08G 1/0112* (2013.01); *G08G 1/0129* (2013.01); *G08G 1/0133* (2013.01); *G08G 1/052* (2013.01); *G08G 1/096775* (2013.01)

(58) Field of Classification Search

CPC ........... G08G 1/096725; G08G 1/0112; G08G 1/0129; G08G 1/0133; G08G 1/052; G08G 1/096775

See application file for complete search history.

(56) References Cited

U.S. PATENT DOCUMENTS 5,283,575 A * 2/1994 Kao ....................... G01C 21/30 73/178 R
6,862,524 B1 * 3/2005 Nagda .............. G08G 1/096816 340/995.13

(Continued)

OTHER PUBLICATIONS

Suriyarachchi et al., "Shock Wave Mitigation in Multi-Lane Highways Using Vehicle-to-Vehicle Communication," 2021 IEEE 94th Vehicular Technology Conference (VTC2021-Fall), 7 pages (https://nileshsuri.github.io/files/conferences/2021/shockwave_VTC_2021_Nilesh.pdf).

(Continued)

*Primary Examiner* — Gertrude Arthur Jeanglaude
(74) *Attorney, Agent, or Firm* — SHEPPARD, MULLIN, RICHTER & HAMPTON LLP; Daniel N. Yannuzzi

(57) ABSTRACT

Systems and methods are provided for activating mitigation strategies through a cloud-based system. Embodiments of the systems and methods disclosed herein can provide mitigation strategies to reduce or eliminate the stop-and-go traffic. A control vehicle can activate a mitigation strategy and operate the vehicle in accordance with the mitigation strategy based on stop-and-go waves. The mitigation strategy may comprise maintaining the vehicle at a reference speed.

20 Claims, 12 Drawing Sheets

(56) References Cited

U.S. PATENT DOCUMENTS

| | | | | |
|---|---|---|---|---|
| 6,867,733 | B2 * | 3/2005 | Sandhu | G08G 1/20 342/357.34 |
| 11,042,163 | B2 * | 6/2021 | Chen | G06V 10/764 |
| 11,493,926 | B2 * | 11/2022 | He | G06N 3/006 |
| 11,814,079 | B2 | 11/2023 | Dagan | |
| 12,091,025 | B2 | 9/2024 | Kwon | |
| 2016/0055744 | A1 | 2/2016 | Branson | |
| 2020/0242922 | A1 * | 7/2020 | Dulberg | G08G 1/096783 |
| 2021/0201669 | A1 | 7/2021 | Mitra | |
| 2022/0388505 | A1 | 12/2022 | Sharma Banjade | |
| 2023/0058169 | A1 | 2/2023 | Cella | |
| 2023/0150502 | A1 | 5/2023 | Dickson | |
| 2023/0316920 | A1 | 10/2023 | Di Cairano | |

OTHER PUBLICATIONS

Di Vaio et al., "Cooperative Shock Waves Mitigation in Mixed Traffic Flow Environment," IEEE Transactions on Intelligent Transportation Systems, 20(12):4339-4353, Dec. 2019 (https://doi.org/10.1109/TITS.2018.2883485).

Malikopoulos et al., "Optimal Control for Speed Harmonization of Automated Vehicles," IEEE Transactions on Intelligent Transportation Systems, 20(7):2405-2417, Sep. 13, 2018 (https://ieeexplore.ieee.org/ielaam/6979/8746731/8464283-aam.pdf).

Li et al., "Cooperative Perception for Estimating and Predicting Microscopic Traffic States to Manage Connected and Automated Traffic," IEEE Transactions on Intelligent Transportation Systems, 23(8):13694-13707, Nov. 30, 2021 (https://doi.org/10.1109/TITS.2021.3126621).

Yuan et al., "Real-Time Lagrangian Traffic State Estimator for Freeways, IEEE Transactions on Intelligent Transportation Systems," 13(1)59-70, Jan. 9, 2012 (https://doi.org/10.1109/TITS.2011.2178837).

Čičić et al., "Modelling and Lagrangian Control of Mixed Traffic: Platoon Coordination, Congestion Dissipation and State Reconstruction," Doctoral Thesis in Electrical Engineering, KTH Royal Institute of Technology, Stockholm, Sweden, 2021 (https://www.diva-portal.org/smash/get/diva2:1528074/FULLTEXT01.pdf).

USDOT, "Freight Performance Measure Approaches for Bottlenecks, Arterials, and Linking Volumes to Congestion Report," Aug. 2015, 104 pages (https://rosap.ntl.bts.gov/view/dot/41268/dot_41268_DS1.pdf).

Čičić et al., "Platoon-Actuated Variable Area Mainstream Traffic Control for Bottleneck Decongestion," European Journal of Control, Elsevier, Jun. 14, 2022, 8 pages (https://doi.org/10.1016/j.ejcon.2022.100687).

Čičić et al., "Coordinating Vehicle Platoons for Highway Bottleneck Decongestion and Throughput Improvement," IEEE Transactions on Intelligent Transportation Systems, 23(7):8959-8971, Jun. 24, 2021, 13 pages (https://doi.org/10.1109/TITS.2021.3088775).

Ibrahim et al., "Control of Platooned Vehicles in Presence of Traffic Shock Waves," 2019 IEEE Intelligent Transportation Systems Conference (ITSC), Oct. 29, 2019, 8 pages (http://www.es.ele.tue.nl/~tbasten/papers/ITSC19_Control_of_Platooned_Vehicles_in_Presence_of_Traffic_Shock_Waves_final.pdf).

Zheng et al., "Freeway Traffic Oscillations: Microscopic Analysis of Formations and Propagations using Wavelet Transform," 19th International Symposium on Transportation and Traffic Theory, 17(2011):717-731 (https://doi.org/10.1016/j.sbspro.2011.04.540).

Sugiyama et al., "Traffic Jams without Bottlenecks—Experimental Evidence for the Physical Mechanism of the Formation of a Jam," New Journal of Physics, 10(2008):033001, Mar. 4, 2008, 8 pages (https://iopscience.iop.org/article/10.1088/1367-2630/10/3/033001).

Beaty, "Traffic 'Experiments' and a Cure for Waves & Jams," 1998 (http://www.amasci.com/amateur/traffic/trafexp.html).

Cui et al., "Stabilizing Traffic Flow Via a Single Autonomous Vehicle: Possibilities and Limitations," 2017 IEEE Intelligent Vehicles Symposium (IV), Jun. 13, 2017, pp. 1336-1341 (https://lab-work.github.io/download/Cui2017.pdf).

Li et al., "Stop- and-Go Traffic Analysis: Theoretical Properties, Environmental Impacts and Oscillation Mitigation," Transportation Research Part B, 70(2014):319-339 (https://doi.org/10.1016/j.trb.2014.09.014).

Wu et al., "Stabilizing Traffic with Autonomous Vehicles," 2018 IEEE International Conference on Robotics and Automation (ICRA), May 2018, pp. 6012-6018 (https://uclalemur.com/publications/wu2018icra.pdf).

Goulet et al., "Impacts of Distributed Speed Harmonization and Optimal Maneuver Planning on Multi-Lane Roads," 2020 IEEE Conference on Control Technology and Applications (CCTA), Aug. 2020, pp. 305-311 (https://www.osti.gov/servlets/purl/1863340).

Xie et al., "Cooperative Driving Strategies of Connected Vehicles for Stabilizing Traffic Flow," Transportmetrica B: Transport Dynamics, 8(1):166-181 (https://doi.org/10.1080/21680566.2020.1728590).

Hale et al., "Introduction of Cooperative Vehicle-to-Infrastructure Systems to Improve Speed Harmonization," USDOT, Federal Highway Administration, Mar. 2016, 54 pages (https://www.fhwa.dot.gov/publications/research/operations/16023/16023.pdf).

Kates et al., "Flow Stabilization and Enhanced Traffic Performance using Inter-Vehicle Communication and Distributed Intelligence," 13th World Congress and Exhibition on Intelligent Transport Systems and Services, Oct. 2006 (https://www.researchgate.net/publication/228574217_Flow_stabilization_and_enhanced_traffic_performance_using_inter-vehicle_communication_and_distributed_intelligence).

Learn et al., "Freeway Speed Harmonization Experiment Using Connected and Automated Vehicles," IET Intelligent Transport Systems, Jan. 22, 2018, 12(5):319-326 (https://doi.org/10.1049/iet-its.2017.0149).

Kreidieh et al., "Dissipating Stop-and-Go Waves in Closed and Open Networks via Deep Reinforcement Learning," 2018 21st International Conference on Intelligent Transportation Systems (ITSC), Nov. 2018, pp. 1475-1480 (https://bayen.berkeley.edu/sites/default/files/08569485.pdf).

Guo et al., "Merging and Diverging Impact on Mixed Traffic of Regular and Autonomous Vehicles," IEEE Transactions on Intelligent Transportation Systems, 22(3):1639-1649, Apr. 29, 2020 (https://doi.org/10.1109/TITS.2020.2974291).

Wu et al., "Flow: A Modular Learning Framework for Mixed Autonomy Traffic," IEEE Transactions on Robotics, 38(2):1270-1286, Jul. 16, 2021 (https://doi.org/10.1109/TRO.2021.3087314).

Wu et al., "Flow: Architecture and Benchmarking for Reinforcement Learning in Traffic Control," arXiv:1710.05465v1 [cs.AI], Oct. 16, 2017 (https://flow-project.github.io/papers/1710.05465.pdf).

Zhu et al., "Merging Control Strategies of Connected and Autonomous Vehicles at Freeway On-Ramps: A Comprehensive Review," Journal of Intelligent and Connected Vehicles, 5(2):99-111, Apr. 11, 2022 (https://www.emerald.com/insight/content/doi/10.1108/JICV-02-2022-0005/full/pdf?title=merging-control-strategies-of-connected-and-autonomous-vehicles-atfreeway-on-ramps-a-comprehensive-review).

Ni et al., "Multivehicle Cooperative Lane Change Control Strategy for Intelligent Connected Vehicle," Journal of Advanced Transportation, 2020:8672928, pp. 1-10, Feb. 28, 2020 (https://doi.org/10.1155/2020/8672928).

Stern et al., "Dissipation of Stop- and-Go Waves via Control of Autonomous Vehicles: Field Experiments," Transportation Research, Part C, Emerging Technologies, 89(C):205-221, Apr. 2018 (https://doi.org/10.1016/j.trc.2018.02.005).

Qu et al., "Jointly Dampening Traffic Oscillations and Improving Energy Consumption with Electric, Connected and Automated Vehicles: A Reinforcement Learning Based Approach," Applied Energy, 257(2020):114030, Jan. 1, 2020, 10 pages (https://doi.org/10.1016/j.apenergy.2019.114030).

Gunter et al., "Model-Based String Stability of Adaptive Cruise Control Systems Using Field Data," IEEE Transactions on Intelligent Vehicles, 5(1):90-99, Nov. 22, 2019 (https://doi.org/10.1109/TIV.2019.2955368).

(56) References Cited

OTHER PUBLICATIONS

Farid et al., "Systems and Methods for Mitigating Lane-Change Disturbance Based on Cooperative Maneuvering," pending U.S. Appl. No. 17/830,776, filed Jun. 2, 2022.
Farid et al., "Systems and Methods for Planning Lane-Change Actions Considering Traffic Stability in Target Lane," U.S. Appl. No. 17/842,065, filed Jun. 16, 2022.

* cited by examiner

CLOUD-BASED STOP-AND-GO MITIGATION SYSTEM WITH MULTI-LANE SENSING

CROSS REFERENCE TO RELATED APPLICATIONS

This application is with U.S. patent application Ser. No. 17/943,665 and U.S. patent application Ser. No. 17/943,803, both of which were filed concurrently with the present application. Each of these applications are hereby incorporated herein by reference in their entirety.

TECHNICAL FIELD

The present disclosure relates generally to mitigating stop-and-go traffic, and in particular, some implementations may relate to determining stop-and-go waves and activating mitigating strategies based on the waves.

DESCRIPTION OF RELATED ART

Stop-and-go traffic refers to the phenomenon where vehicles in traffic experience periods of deceleration. Stop-and-go traffic can occur for various reasons, including metered lights, lane changes, accidents, or other obstacles encountered during traffic. Mitigation strategies can be applied to reduce stop-and-go traffic or prevent such a traffic situation from occurring. However, it can be difficult for drivers to apply these strategies because the driver might not be able to perceive a stop-and-go situation until the vehicle is forced to slow down. Better methods are needed to improve automated vehicle operation and transit strategies overall.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
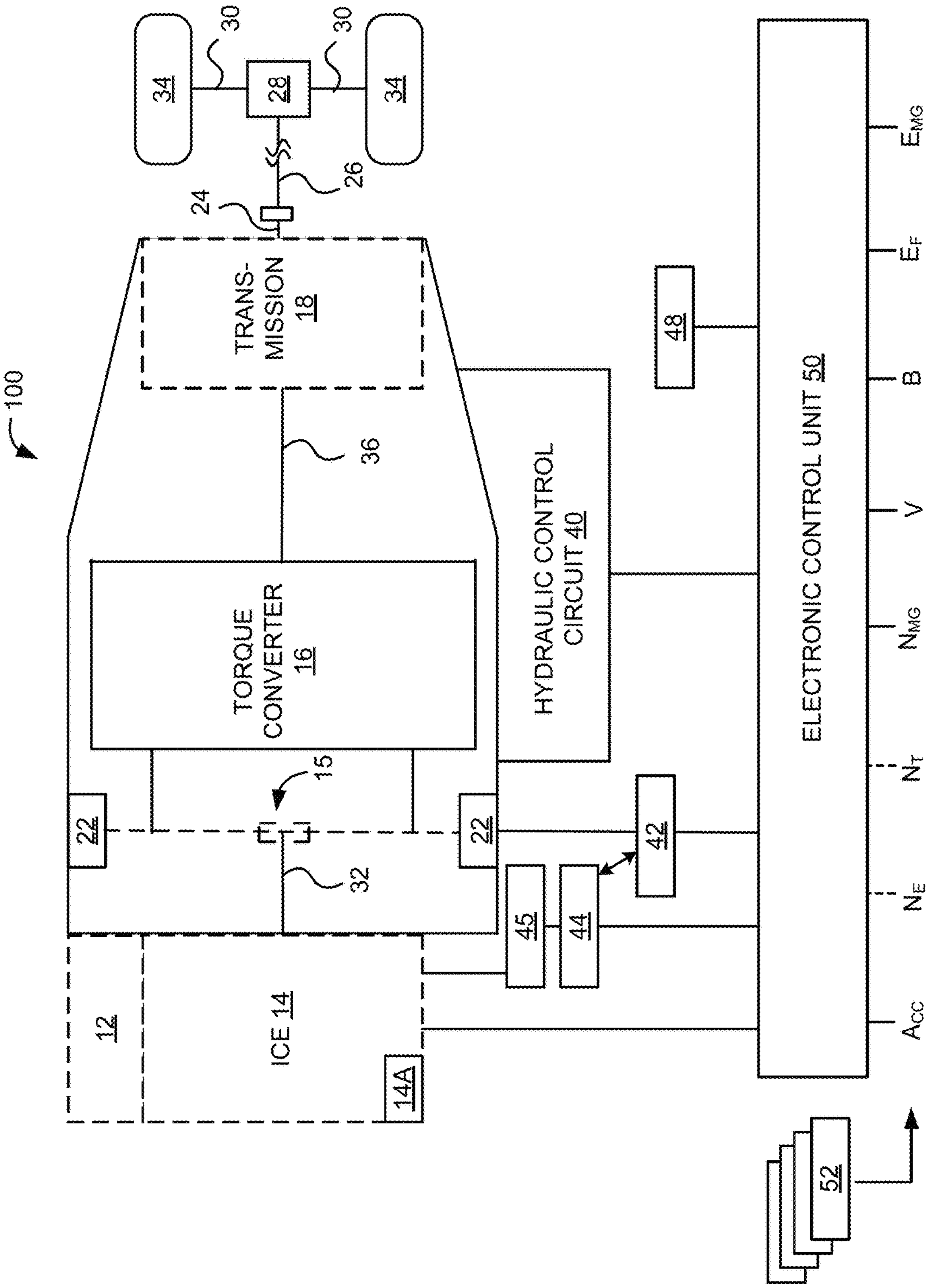
FIG. 1 is a schematic representation of an example hybrid vehicle with which embodiments of the systems and methods disclosed herein may be implemented.

The figures are not exhaustive and do not limit the present disclosure to the precise form disclosed.

DETAILED DESCRIPTION

As described above, stop-and-go traffic can occur for various reasons, including metered lights, lane changes, accidents, or other obstacles encountered during traffic. Embodiments of the systems and methods disclosed herein can provide mitigation strategies to reduce or eliminate the stop-and-go traffic. Mitigation strategies can be applied to reduce stop-and-go traffic or prevent such a traffic situation from occurring. For example, a cloud-based system can predict when to apply mitigation strategies based on local vehicle data (e.g., from a control vehicle), remote vehicle data (e.g., data from connected vehicles within a proximity distance of the control vehicle that are shared via a cloud or directly from the vehicle), and infrastructure data.

As used herein, “stop-and-go wave” can refer to an event where a vehicle is caused to slow down and stop due to a traffic element, and then accelerates back to a cruising speed after a time period. A “phase” can refer to a partition of a stop-and-go wave characterized by a particular trend in the vehicle’s velocity (deceleration, acceleration, etc.). A vehicle’s “trajectory” can refer to a vehicle’s position over time, including its predicted position at a future time. A “control zone” can refer to a bounded area where a vehicle can apply mitigation strategies to reduce or eliminate stop-and-go waves. A “deceleration profile” can refer to a vehicle’s predicted deceleration due to a stop-and-go wave. A “wavelength” of a stop-and-go wave can refer to the distance where a vehicle decelerates due to traffic, stops, accelerates to a cruising speed, and then is forced to decelerate again.

Stop-and-go waves can be determined based on a trajectory. Cloud-based systems can use these stop-and-go waves to suggest mitigation strategies to vehicles before the vehicles experience stop-and-go waves. For example, a stop-and-go wave can comprise a deceleration phase, a stopping phase, an acceleration phase, and a cruising phase.

Each wavelength may have a time threshold that dictates the length of the wavelength. The time threshold may be constant between wavelengths, or may vary based on real-time traffic situations. The system can determine that the control vehicle is about to enter or may be currently entering a deceleration phase, meaning that the control vehicle would not need to experience a stop-and-go wave.

The cloud-based system can determine its trajectory based on various factors, including vehicle data such as sensor data, infrastructure data, or connected vehicle data.

When determining the trajectory based on sensor data internal to the subject vehicle, the vehicle tracks its position through time using position information obtained from systems such as Global Positioning System (GPS). When determining the trajectory based on the preceding vehicle, infrastructure data, or other external factors, the subject vehicle may be equipped with one or more sensors, including for example, gap detection sensors to determine the distance between vehicles in front of the control vehicle. For example, the control vehicle can determine that the preceding vehicle is entering a deceleration phase by tracking the preceding vehicle’s position through time, utilizing gap detection sensor’s data along with the control vehicle’s position information obtained from systems, such as GPS.

Infrastructure data refers to data available from traffic signals, ramp meters, sign mapping (e.g., data defining where stop signs and other traffic signs are), detectors, or other infrastructure elements. When determining the trajectory based on infrastructure data, the systems tracks the position of the vehicle through time using position information obtained from the infrastructure data.

Connected vehicle data refers to data shared between multiple vehicles. This data can include vehicle sensor data, GPS data, gap detection data, or other relationships a vehicle shares with other vehicles and the environment. When determining the trajectory based on connected vehicle data, the system tracks the position of the vehicle through time using position information obtained from the connected vehicle.

When a deceleration phase is determined, the control vehicle can activate a mitigation strategy and operate the vehicle in accordance with the mitigation strategy. The mitigation strategy may comprise maintaining the vehicle at a reference speed (e.g., through automated driving, directions to a driver, or hybrid automated driving system) in order to avoid future stop-and-go waves.

The systems and methods disclosed herein may be implemented with any of a number of different vehicles and vehicle types. For example, the systems and methods disclosed herein may be used with automobiles, trucks, motorcycles, recreational vehicles and other like on- or off-road vehicles. In addition, the principles disclosed herein may also extend to other vehicle types as well. An example hybrid electric vehicle (HEV) in which embodiments of the disclosed technology may be implemented is illustrated in FIG. 1. Although the example described with reference to FIG. 1 is a hybrid type of vehicle, the systems and methods for activating mitigation strategies can be implemented in other types of vehicle including gasoline- or diesel-powered vehicles, fuel-cell vehicles, electric vehicles, or other vehicles.

FIG. 1 illustrates a drive system of a vehicle 100 that may include an internal combustion engine 14 and one or more electric motors 22 (which may also serve as generators) as sources of motive power. Driving force generated by the internal combustion engine 14 and motors 22 can be transmitted to one or more wheels 34 via a torque converter 16, a transmission 18, a differential gear device 28, and a pair of axles 30.

As an HEV, vehicle 100 may be driven/powered with either or both of engine 14 and the motor(s) 22 as the drive source for travel. For example, a first travel mode may be an engine-only travel mode that only uses internal combustion engine 14 as the source of motive power. A second travel mode may be an EV travel mode that only uses the motor(s) 22 as the source of motive power. A third travel mode may be an HEV travel mode that uses engine 14 and the motor(s) 22 as the sources of motive power. In the engine-only and HEV travel modes, vehicle 100 relies on the motive force generated at least by internal combustion engine 14, and a clutch 15 may be included to engage engine 14. In the EV travel mode, vehicle 100 is powered by the motive force generated by motor(s) 22 while engine 14 may be stopped and clutch 15 disengaged.

Engine 14 can be an internal combustion engine such as a gasoline, diesel or similarly powered engine in which fuel is injected into and combusted in a combustion chamber. A cooling system 12 can be provided to cool the engine 14 such as, for example, by removing excess heat from engine 14. For example, cooling system 12 can be implemented to include a radiator, a water pump and a series of cooling channels. In operation, the water pump circulates coolant through the engine 14 to absorb excess heat from the engine. The heated coolant is circulated through the radiator to remove heat from the coolant, and the cold coolant can then be recirculated through the engine. A fan may also be included to increase the cooling capacity of the radiator. The water pump, and in some instances the fan, may operate via a direct or indirect coupling to the driveshaft of engine 14. In other applications, either or both the water pump and the fan may be operated by electric current such as from battery 44.

An output control circuit 14A may be provided to control drive (output torque) of engine 14. Output control circuit 14A may include a throttle actuator to control an electronic throttle valve that controls fuel injection, an ignition device that controls ignition timing, and the like. Output control circuit 14A may execute output control of engine 14 according to a command control signal(s) supplied from an electronic control unit 50, described below. Such output control can include, for example, throttle control, fuel injection control, and ignition timing control.

Motor 22 can also be used to provide motive power in vehicle 100 and is powered electrically via a battery 44. Battery 44 may be implemented as one or more batteries or other power storage devices including, for example, lead-acid batteries, nickel-metal hydride batteries, lithium ion batteries, capacitive storage devices, and so on. Battery 44 may be charged by a battery charger 45 that receives energy from internal combustion engine 14. For example, an alternator or generator may be coupled directly or indirectly to a drive shaft of internal combustion engine 14 to generate an electrical current as a result of the operation of internal combustion engine 14. A clutch 15 can be included to engage/disengage the battery charger 45. Battery 44 may also be charged by motor 22 such as, for example, by regenerative braking or by coasting during which time motor 22 operate as generator.

Motor 22 can be powered by battery 44 to generate a motive force to move the vehicle and adjust vehicle speed. Motor 22 can also function as a generator to generate electrical power such as, for example, when coasting or braking. Battery 44 may also be used to power other electrical or electronic systems in the vehicle. Motor 22 may be connected to battery 44 via an inverter 42. Battery 44 can include, for example, one or more batteries, capacitive storage units, or other storage reservoirs suitable for storing electrical energy that can be used to power motor 22. When battery 44 is implemented using one or more batteries, the batteries can include, for example, nickel metal hydride batteries, lithium ion batteries, lead acid batteries, nickel cadmium batteries, lithium ion polymer batteries, and other types of batteries.

An electronic control unit 50 (described below) may be included and may control the electric drive components of the vehicle as well as other vehicle components. For example, electronic control unit 50 may control inverter 42, adjust driving current supplied to motor 22, and adjust the current received from motor 22 during regenerative coasting and breaking. As a more particular example, output torque of the motor 22 can be increased or decreased by electronic control unit 50 through the inverter 42.

A torque converter 16 can be included to control the application of power from engine 14 and motor 22 to transmission 18. Torque converter 16 can include a viscous fluid coupling that transfers rotational power from the motive power source to the driveshaft via the transmission. Torque converter 16 can include a conventional torque converter or a lockup torque converter. In other embodiments, a mechanical clutch can be used in place of torque converter 16.

Clutch 15 can be included to engage and disengage engine 14 from the drivetrain of the vehicle. In the illustrated example, a crankshaft 32, which is an output member of engine 14, may be selectively coupled to the motor 22 and torque converter 16 via clutch 15. Clutch 15 can be implemented as, for example, a multiple disc type hydraulic frictional engagement device whose engagement is controlled by an actuator such as a hydraulic actuator. Clutch 15 may be controlled such that its engagement state is complete engagement, slip engagement, and complete disengagement complete disengagement, depending on the pressure applied to the clutch. For example, a torque capacity of clutch 15 may be controlled according to the hydraulic pressure supplied from a hydraulic control circuit (not illustrated). When clutch 15 is engaged, power transmission is provided in the power transmission path between the crankshaft 32 and torque converter 16. On the other hand, when clutch 15 is disengaged, motive power from engine 14 is not delivered to the torque converter 16. In a slip engagement state, clutch 15 is engaged, and motive power is provided to torque converter 16 according to a torque capacity (transmission torque) of the clutch 15.

As alluded to above, vehicle 100 may include an electronic control unit 50. Electronic control unit 50 may include circuitry to control various aspects of the vehicle operation. Electronic control unit 50 may include, for example, a microcomputer that includes a one or more processing units (e.g., microprocessors), memory storage (e.g., RAM, ROM, etc.), and I/O devices. The processing units of electronic control unit 50, execute instructions stored in memory to control one or more electrical systems or subsystems in the vehicle. Electronic control unit 50 can include a plurality of electronic control units such as, for example, an electronic engine control module, a powertrain control module, a transmission control module, a suspension control module, a body control module, and so on. As a further example, electronic control units can be included to control systems and functions such as doors and door locking, lighting, human-machine interfaces, cruise control, telematics, braking systems (e.g., ABS or ESC), battery management systems, and so on. These various control units can be implemented using two or more separate electronic control units, or using a single electronic control unit.

In the example illustrated in FIG. 1, electronic control unit 50 receives information from a plurality of sensors included in vehicle 100. For example, electronic control unit 50 may receive signals that indicate vehicle operating conditions or characteristics, or signals that can be used to derive vehicle operating conditions or characteristics. These may include, but are not limited to accelerator operation amount, $A_{CC}$, a revolution speed, $N_E$, of internal combustion engine 14 (engine RPM), a rotational speed, $N_{MG}$, of the motor 22 (motor rotational speed), and vehicle speed, $N_V$. These may also include torque converter 16 output, $N_T$ (e.g., output amps indicative of motor output), brake operation amount/pressure, B, battery SOC (i.e., the charged amount for battery 44 detected by an SOC sensor). Accordingly, vehicle 100 can include a plurality of sensors 52 that can be used to detect various conditions internal or external to the vehicle and provide sensed conditions to engine control unit 50 (which, again, may be implemented as one or a plurality of individual control circuits). In one embodiment, sensors 52 may be included to detect one or more conditions directly or indirectly such as, for example, fuel efficiency, $E_F$, motor efficiency, $E_{MG}$, hybrid (internal combustion engine 14+MG 12) efficiency, acceleration, $A_{CC}$, gap detection, etc.

In some embodiments, one or more of the sensors 52 may include their own processing capability to compute the results for additional information that can be provided to electronic control unit 50. In other embodiments, one or more sensors may be data-gathering-only sensors that provide only raw data to electronic control unit 50. In further embodiments, hybrid sensors may be included that provide a combination of raw data and processed data to electronic control unit 50. Sensors 52 may provide an analog output or a digital output.

Sensors 52 may be included to detect not only vehicle conditions but also to detect external conditions as well. Sensors that might be used to detect external conditions can include, for example, sonar, radar, lidar or other vehicle proximity sensors, and cameras or other image sensors. Image sensors can be used to detect, for example, traffic signs indicating a current speed limit, road curvature, obstacles, and so on. Still other sensors may include those that can detect road grade. While some sensors can be used to actively detect passive environmental objects, other sensors can be included and used to detect active objects such as those objects used to implement smart roadways that may actively transmit and/or receive data or other information.

The example of FIG. 1 is provided for illustration purposes only as one example of vehicle systems with which embodiments of the disclosed technology may be implemented. One of ordinary skill in the art reading this description will understand how the disclosed embodiments can be implemented with this and other vehicle platforms.

Figure 2:
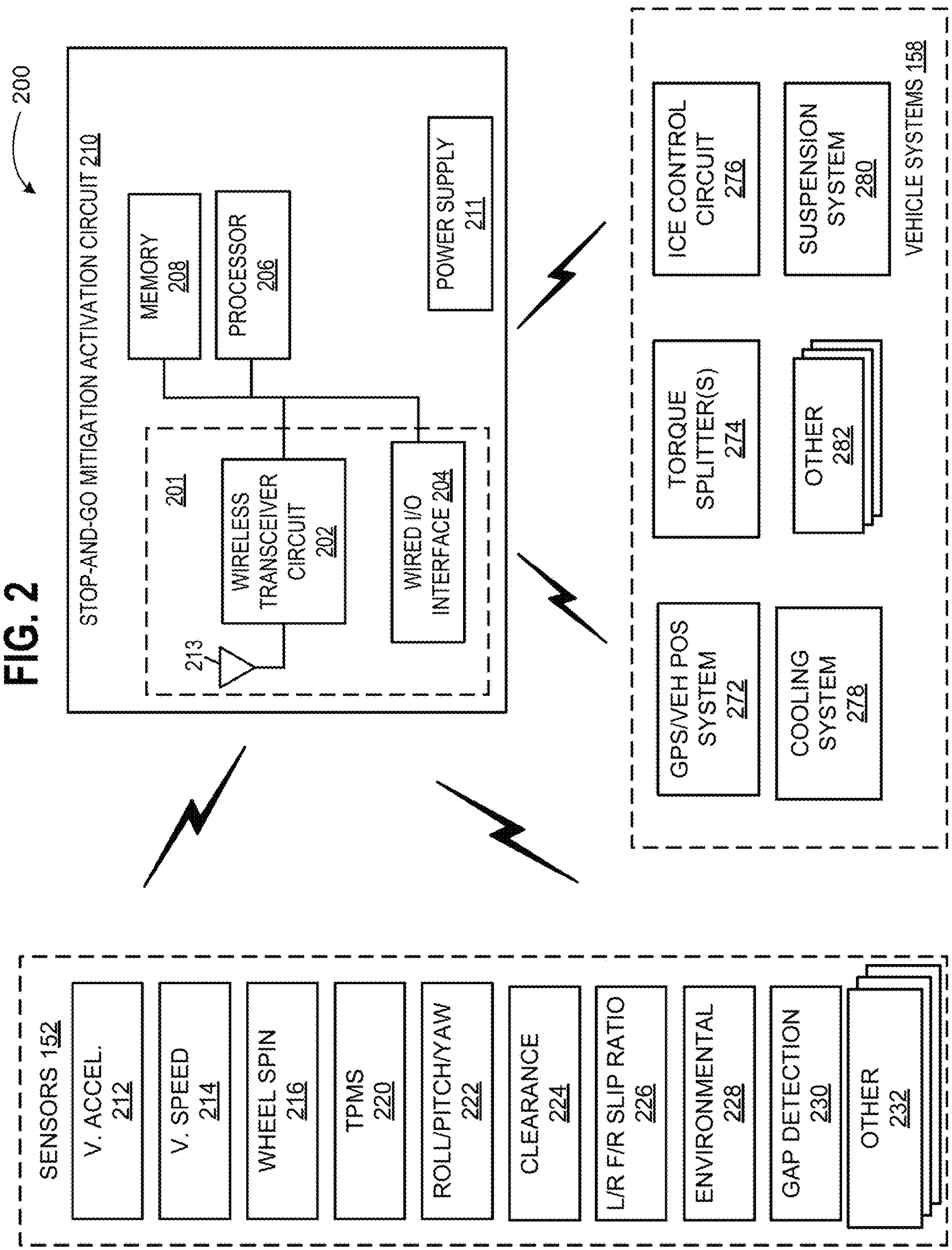
FIG. 2 illustrates an example of an all-wheel drive hybrid vehicle with which embodiments of the systems and methods disclosed herein may be implemented.

FIG. 2 illustrates an example vehicle system for activating mitigation strategies in accordance with one embodiment of the systems and methods described herein. In this example, system 200 includes a stop-and-go mitigation activation circuit 210, a plurality of sensors 152 and a plurality of vehicle systems 158. Sensors 152 and vehicle systems 158 can communicate with stop-and-go mitigation activation circuit 210 via a wired or wireless communication interface. Although sensors 152 and vehicle systems 158 are depicted as communicating with stop-and-go mitigation activation circuit 210, they can also communicate with each other as well as with other vehicle systems. Stop-and-go mitigation activation circuit 210 can be implemented as an ECU or as part of an ECU such as, for example electronic control unit 50. In other embodiments, stop-and-go mitigation activation circuit 210 can be implemented independently of the ECU.

Stop-and-go mitigation activation circuit 210 includes a communication circuit 201, a processor 206, a memory 208, and a power supply 211. Components of stop-and-go mitigation activation circuit 210 are illustrated as communicating with each other via a data bus, although other communication in interfaces can be included.

Processor 206 can include one or more GPUs, CPUs, microprocessors, or any other suitable processing system. Processor 206 may include a single core or multicore processors. The memory 208 may include one or more various forms of memory or data storage (e.g., flash, RAM, etc.) that may be used to store the calibration parameters, images (analysis or historic), point parameters, instructions and variables for processor 206 as well as any other suitable information. Memory 208 can be made up of one or more modules of one or more different types of memory, and may be configured to store data and other information as well as operational instructions that may be used by the processor 206 to initiate stop-and-go mitigation activation circuit 210.

Although the example of FIG. 2 is illustrated using processor 206 and memory 208, as described below with reference to circuits disclosed herein, decision circuit 203 can be implemented utilizing any form of circuitry including, for example, hardware, software, or a combination thereof. By way of further example, one or more processors, controllers, ASICs, PLAs, PALs, CPLDs, FPGAs, logical components, software routines or other mechanisms might be implemented to make up a stop-and-go mitigation activation circuit 210.

Communication circuit 201 either or both a wireless transceiver circuit 202 with an associated antenna 213 and a wired I/O interface 204 with an associated hardwired data port (not illustrated). As this example illustrates, communications with stop-and-go mitigation activation circuit 210 can include either or both wired and wireless communications circuits 201. Wireless transceiver circuit 202 can include a transmitter and a receiver (not shown) to allow wireless communications via any of a number of communication protocols such as, for example, WiFi, Bluetooth, near field communications (NFC), Zigbee, and any of a number of other wireless communication protocols whether standardized, proprietary, open, point-to-point, networked or otherwise. Antenna 213 is coupled to wireless transceiver circuit 202 and is used by wireless transceiver circuit 202 to transmit radio signals wirelessly to wireless equipment with which it is connected and to receive radio signals as well. These RF signals can include information of almost any sort that is sent or received by stop-and-go mitigation activation circuit 210 to/from other entities such as sensors 152 and vehicle systems 158.

Wired I/O interface 204 can include a transmitter and a receiver (not shown) for hardwired communications with other devices. For example, wired I/O interface 204 can provide a hardwired interface to other components, including sensors 152 and vehicle systems 158. Wired I/O interface 204 can communicate with other devices using Ethernet or any of a number of other wired communication protocols whether standardized, proprietary, open, point-to-point, networked or otherwise.

Power supply 211 can include one or more of a battery or batteries (such as, e.g., Li-ion, Li-Polymer, NiMH, NiCd, NiZn, and $NiH_2$, to name a few, whether rechargeable or primary batteries,), a power connector (e.g., to connect to vehicle supplied power, etc.), an energy harvester (e.g., solar cells, piezoelectric system, etc.), or it can include any other suitable power supply.

Sensors 152 can include, for example, sensors 52 such as those described above with reference to the example of FIG. 1. Sensors 152 can include additional sensors that may or may not otherwise be included on a standard vehicle (e.g. vehicle 100) with which the system 200 is implemented. In the illustrated example, sensors 152 include vehicle acceleration sensors 212, vehicle speed sensors 214, wheelspin sensors 216 (e.g., one for each wheel), a tire pressure monitoring system (TPMS) 220, accelerometers such as a 3-axis accelerometer 222 to detect roll, pitch and yaw of the vehicle, vehicle clearance sensors 224, left-right and front-rear slip ratio sensors 226, environmental sensors 228 (e.g., to detect salinity or other environmental conditions), and gap detection sensors 230 (e.g. to detect vehicles in front, behind, or to the side of the control vehicle). Additional sensors 232 can also be included as may be appropriate for a given implementation of system 200.

Vehicle systems 158 can include any of a number of different vehicle components or subsystems used to control or monitor various aspects of the vehicle and its performance. In this example, the vehicle systems 158 include a GPS or other vehicle positioning system 272; torque splitters 274 that can control distribution of power among the vehicle wheels such as, for example, by controlling front/rear and left/right torque split; engine control circuits 276 to control the operation of engine (e.g. Internal combustion engine 14); cooling systems 278 to provide cooling for the motors, power electronics, the engine, or other vehicle systems; suspension system 280 such as, for example, an adjustable-height air suspension system, or an adjustable-damping suspension system; and other vehicle systems 282.

During operation, stop-and-go mitigation activation circuit 210 can receive information from various vehicle sensors to determine whether mitigation strategies should be activated. For example, the circuit can receive vehicle's position information from sensors such as GPS and track the vehicle's own position through time and create a trajectory data. In another example, the circuit can utilize information from a gap detection sensor along with the vehicle's position sensor to track the preceding vehicle's position through time and create the preceding vehicle's trajectory data.

Communication circuit 201 can be used to transmit and receive information between stop-and-go mitigation activation circuit 210 and sensors 152, and stop-and-go mitigation activation circuit 210 and vehicle systems 158. Also, sensors 152 may communicate with vehicle systems 158 directly or indirectly (e.g., via communication circuit 201 or otherwise).

In various embodiments, communication circuit 201 can be configured to receive data and other information from sensors 152 that is used in determining whether to activate mitigation strategies. This information can comprise data to generate a control vehicle or preceding vehicle's trajectory, as described above. The control vehicle can determine that stop-and-go waves are occurring based on this trajectory data and can implement mitigation strategies accordingly. Additionally, communication circuit 201 can be used to send an activation signal or other activation information to various vehicle systems 158 as part of entering the mitigation mode. For example, as described in more detail below, communication circuit 201 can be used to send signals to one or more of: torque splitters 274 to control front/rear torque split and left/right torque split; motor controllers 276 to, for example, control motor torque, motor speed of the various motors in the system; ICE control circuit 276 to, for example, control power to engine 14 (e.g., to shut down the engine so all power goes to the rear motors, to ensure the engine is running to charge the batteries or allow more power to flow to the motors); cooling system (e.g., 278 to increase cooling system flow for one or more motors and their associated electronics); suspension system 280 (e.g., to increase ground clearance such as by increasing the ride height using the air suspension). The decision regarding what action to take via these various vehicle systems 158 can be made based on the information detected by sensors 152. Examples of this are described in more detail below.

Figure 3A:
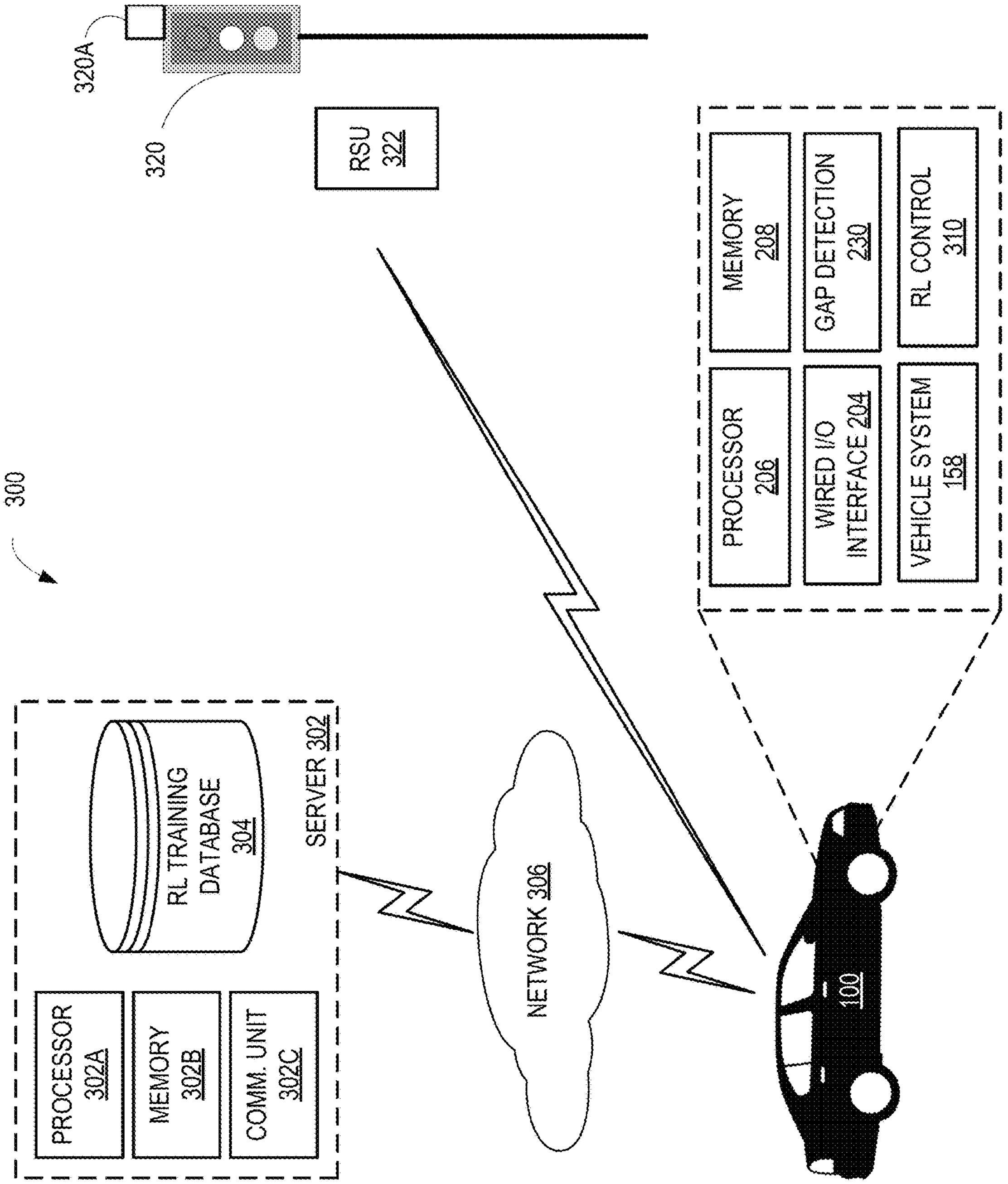
FIG. 3A illustrates an example cloud system in accordance with various embodiments.
Figure 3B:
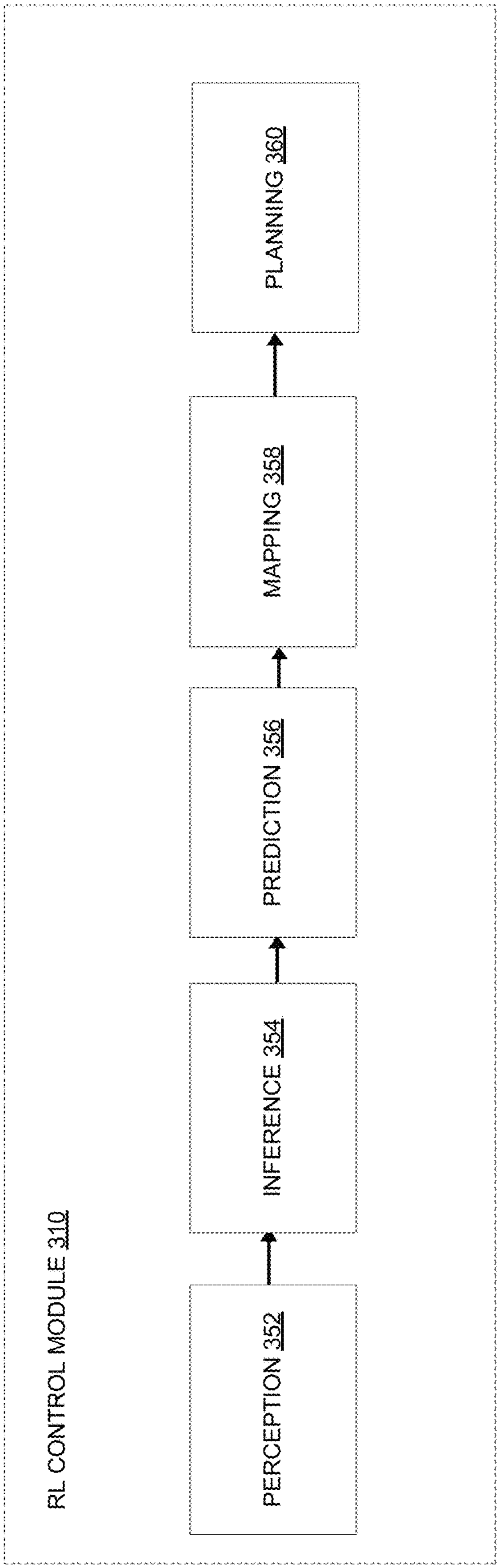
FIG. 3B illustrates an example reinforced learning control module in accordance with various embodiments.

FIGS. 3A-3B illustrate a cloud-based system 300 and component parts of the system 300 for applying mitigation strategies. System 300 includes a server 302, vehicle 100, and a network 306 over which vehicle 100 may communicate with server 302. It should be noted that in this embodiment, vehicle 100 may be collecting data by traversing various roadways, the collected data including infrastructure data and connected vehicle data. An example of infrastructure data may be data on traffic signals, e.g. traffic signal 320. As previously discussed, vehicle 100 may include one or more sensors 152, at least one of which may be a gap detection sensor 230 to receive data on vehicles preceding or behind vehicle 100. It should be understood that system 300 is an example, and system 300 in addition to other systems contemplated in accordance with the present disclosure may include additional and/or fewer components, may combine components, and/or divide one or more of the components into additional components, etc. For example, system 300 may include any number of vehicles and servers.

Network 306 can be a conventional type of communication network that is wired or wireless, and may have numerous different configurations including a star configuration, token ring configuration, or other configurations. Furthermore, the network 306 may include one or more local area networks (LAN), wide area networks (WAN) (e.g., the Internet), public networks, private networks, virtual networks, peer-to-peer networks, and/or other interconnected data paths across which multiple devices may communicate. For instance, the network 306 may include a vehicle-to-vehicle (V2V) network, a vehicle-to-infrastructure/infrastructure-to-vehicle network (V2I), etc.

The network 306 may also be coupled to or include portions of a telecommunications network for sending data in a variety of different communication protocols. In some embodiments, the network 306 includes Bluetooth communication networks or a cellular communications network for sending and receiving data including via short messaging service (SMS), multimedia messaging service (MMS), hypertext transfer protocol (HTTP), direct data connection, WAP, email, etc. In some embodiments, the network 306 is a wireless network using a connection such as DSRC, WAVE, 802.11p, a 3G, 4G, 5G+ network, WiFi™, or any other wireless networks. Although FIG. 3A illustrates a single block for the network 306 that couples to the server 302 and to vehicle 100, it should be understood that the network 306 may in practice, comprise any number of combination of networks, as noted above.

The server 302 can include a hardware and/or virtual server that includes a processor 302A, a memory 302B, and network communication capabilities (e.g., a communication unit 302C). The server 302 may be communicatively coupled to the network 306. In some embodiments, the server 302 can send and receive data to and from vehicle 100 (as well as other servers, data repositories, and the like). The server 302 may include an instance of a reinforced learning training database 304 that may include data related to a stop-and-go wave prediction that is inconsistent with V2I data.

The reinforcement learning training database 304 may store data representative of a plurality of previous stop-and-go waves determined and mitigated during previous traffic situations. This database may also comprise simulation data based on controlled scenarios. In FIG. 3A, the server 302 is shown as including the reinforcement learning training database 304, however it should be understood that vehicle 100 and/or another component of the system 300, may additionally and/or alternatively store or cache the training data. For instance, vehicle 100 may include an instance of the reinforcement learning training database 304, may cache data from the reinforcement learning training database 304, etc. For instance, the mitigation data may be pre-stored/installed in vehicle 100, stored and/or refreshed upon setup or first use, replicated at various intervals, updated upon identification of a scenario resulting in incorrect/inconsistent stop-and-go wave mitigation, etc. In further embodiments, data from the reinforcement learning database 304 may be requested/downloaded at runtime. Other suitable variations are also possible and contemplated. The system may also receive a trained model such that training data is not necessary. For example, this trained model may be requested/downloaded at runtime.

Vehicle 100 includes a processor 206, a memory 208, a wired I/O interface 204, (as described above in FIG. 2) and a reinforced learning (RL) control module 310 (described in greater detail below). Processor 206 may be any suitable processor, which is coupled to other components of vehicle 100, such as one or more sensors, actuators, motivators, etc. Vehicle 100 may send and receive data to and from server 302.

Memory 208 of vehicle 100 may capture data, e.g. position, time, or velocity using gap detection sensors 230 or other sensors 152 which can be processed by RL control module 310. Depending on the implementation of mitigation strategies, in some instances, the captured data can be uploaded to traffic light training database 304, e.g., when a predicted traffic light state/condition is inconsistent with that reflected by V2I information.

Regarding the V2I information, FIG. 3A illustrates traffic signal 320 as being operatively connected to a V2I component or element 320A that allows traffic signal 320 to communicate traffic signal data (e.g., state, operating condition) to connected vehicles, e.g., V2I/V2V/V2X-capable vehicles. That is, V2I component 320A may transmit information regarding the state/operating condition of traffic signal 320, e.g., what stage of the traffic signal is active (stop, go, slow down). In some embodiments, V2I information regarding traffic signal 320 may also include information regarding a particular lane(s) of a road or intersection that traffic signal 320 may control. Still other related information can be gleaned by V2I component 320A from traffic signal 320. In other embodiments, V2I communications may be effectuated via a roadside unit/equipment (RSU/RSE) 322. Similar to V2I component 320A, RSU 322 may communicate with and obtain relevant operating conditions/state information regarding traffic signal 320 which can then be relayed to a vehicle, such as vehicle 100, as would be understood by those of ordinary skill in the art. That is, although not illustrated, similar to vehicle 100, RSU 422/V2I component 320A may comprise at least a controller/processor, memory, and communications unit. The controller/processor may handle receipt of/capturing, in this case, traffic light data from traffic light 320, processing the data as needed, storing/caching the data in memory, and conveying the data to vehicle 100.

FIG. 3B illustrates RL control module 310 in more detail. RL control module 310 can receive sensor data, infrastructure data, and/or connected vehicle data. RL control module 310 can use perception 352, which can comprise detection or localization, to identify the data received and the corresponding infrastructure features or vehicle. RL control module 310 can use inference 354 to determine the traffic state or other events occurring on a road. As described further below, RL control module 310 can infer the existence of stop-and-go waves and its phases to implement mitigation strategies at certain points during a particular stop-and-go wave. RL control module 310 can use prediction 356 to determine upcoming stop-and-go waves based on patterns in the received data. As described further below, a particular vehicle's position over time can be determined, such that the wavelengths of a stop-and-go wave and periods associated with the wavelengths can be predicted, depending on the consistency of the stop-and-go waves. RL control module 310 can use mapping 358 to determine a trajectory for one or more vehicles, including the predicted trajectory for future stop-and-go waves. As described further below, this map may be updated at intervals or may be updated in real-time depending on the availability of sensor and/or position data. RL control module can use this map for planning 360, which can comprise implementing mitigation strategies, as described further below.

Figure 4:
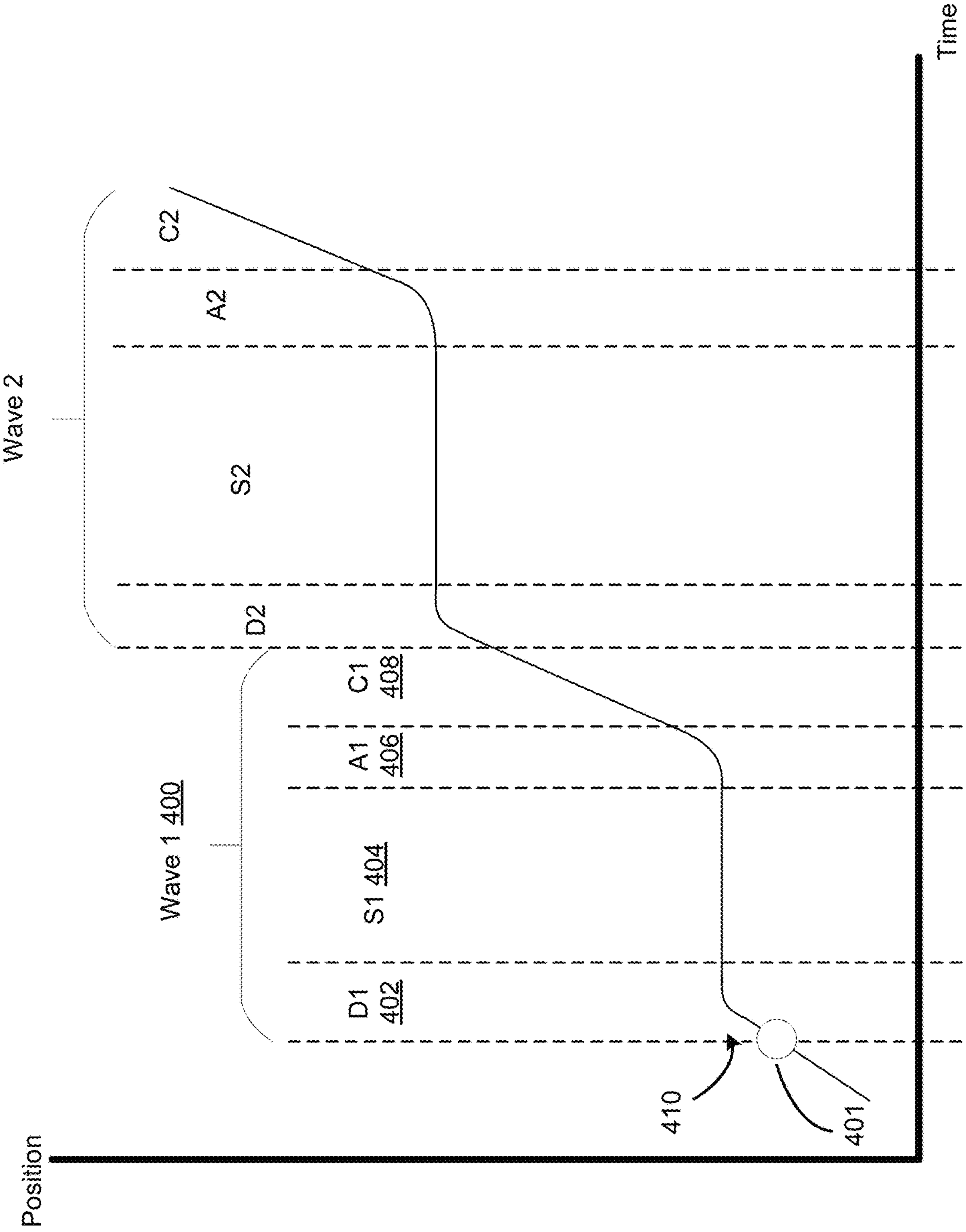
FIG. 4 illustrates an example measurement of stop-and-go waves in accordance with embodiments of the systems and methods disclosed herein.

FIG. 4 illustrates two example stop-and-go waves in accordance with one embodiment of the systems and methods described herein. In this example, a graph can display the control vehicle's position over time as trajectory 310. The control vehicle can track its position over time using various sensor data, including vehicle acceleration sensors 212 and vehicle speed sensors 214 illustrated in FIG. 2. In a stop-and-go traffic situation, the vehicle can generate a wave associated with vehicle's path or trajectory by receiving sensor data and graphing the position of the control vehicle over time as illustrated in FIG. 4, which in turn can be divided into stop-and-go phases. In this example, the velocity of the vehicle may correspond with the slope of the trajectory curve in the chart.

Wave 400 can begin with deceleration phase D1 402, which corresponds with the vehicle decelerating from its initial speed starting at point 401, i.e. when the slope, or velocity of the trajectory, decreases towards 0 (e.g., prior to reaching zero). Once the vehicle stops, it enters the stopping phase as illustrated in phase S1 404. During phase S1 404, the slope of the trajectory is 0. The vehicle can then enter acceleration phase A1 406, where the vehicle begins to speed up again. During phase A1 406, the slope gradually increases. Once the vehicle's speed is constant, the slope is constant, suggesting that the vehicle has entered cruising phase C1 408. Wave 400 concludes when cruising phase C1 408 ends, meaning that the vehicle begins decelerating again. At this point, a next stop-and-go wave can occur.

Figure 5A:
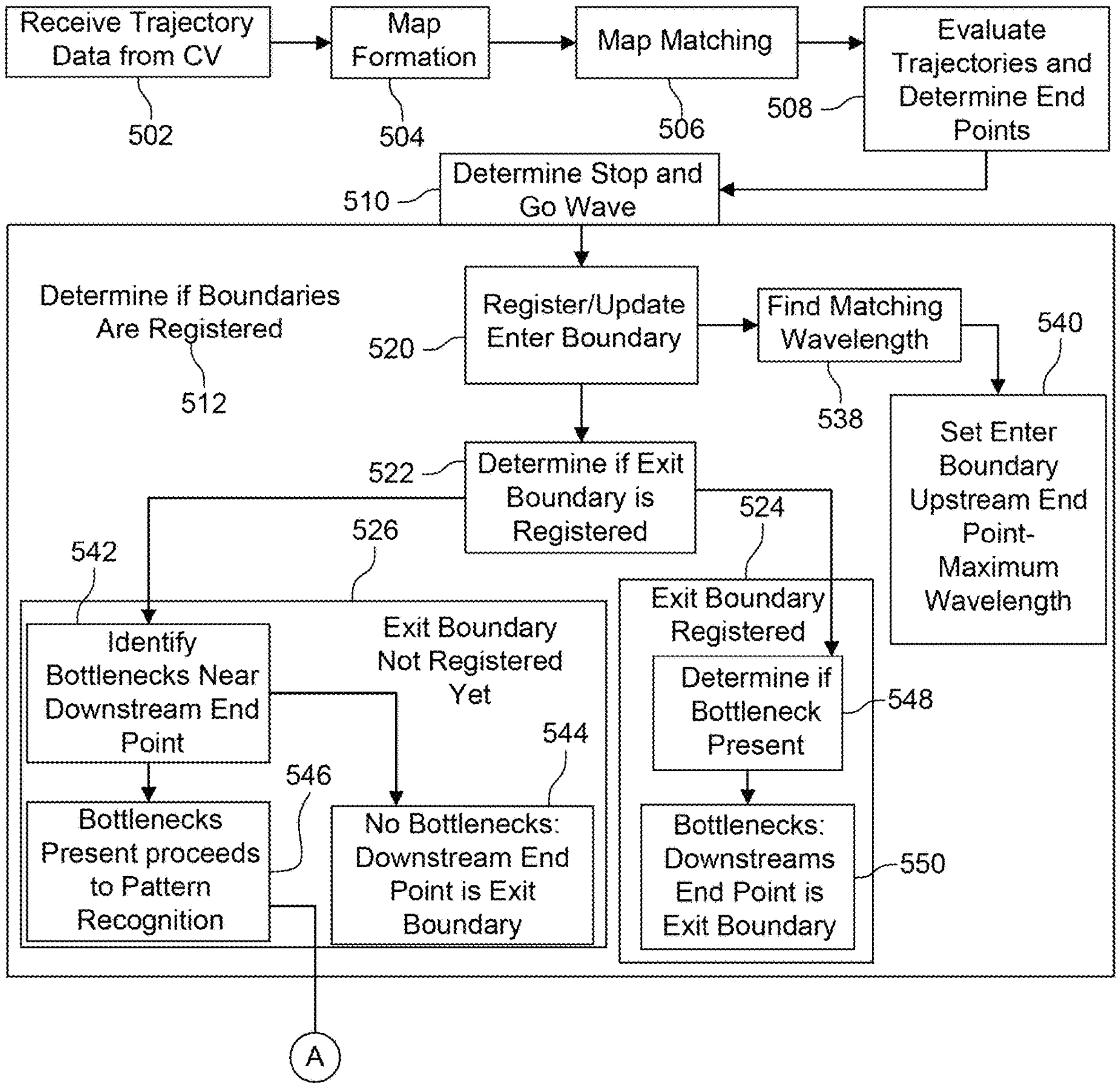
FIG. 5A illustrates an example cloud-computing system in accordance with various embodiments described herein.
Figure 5A:
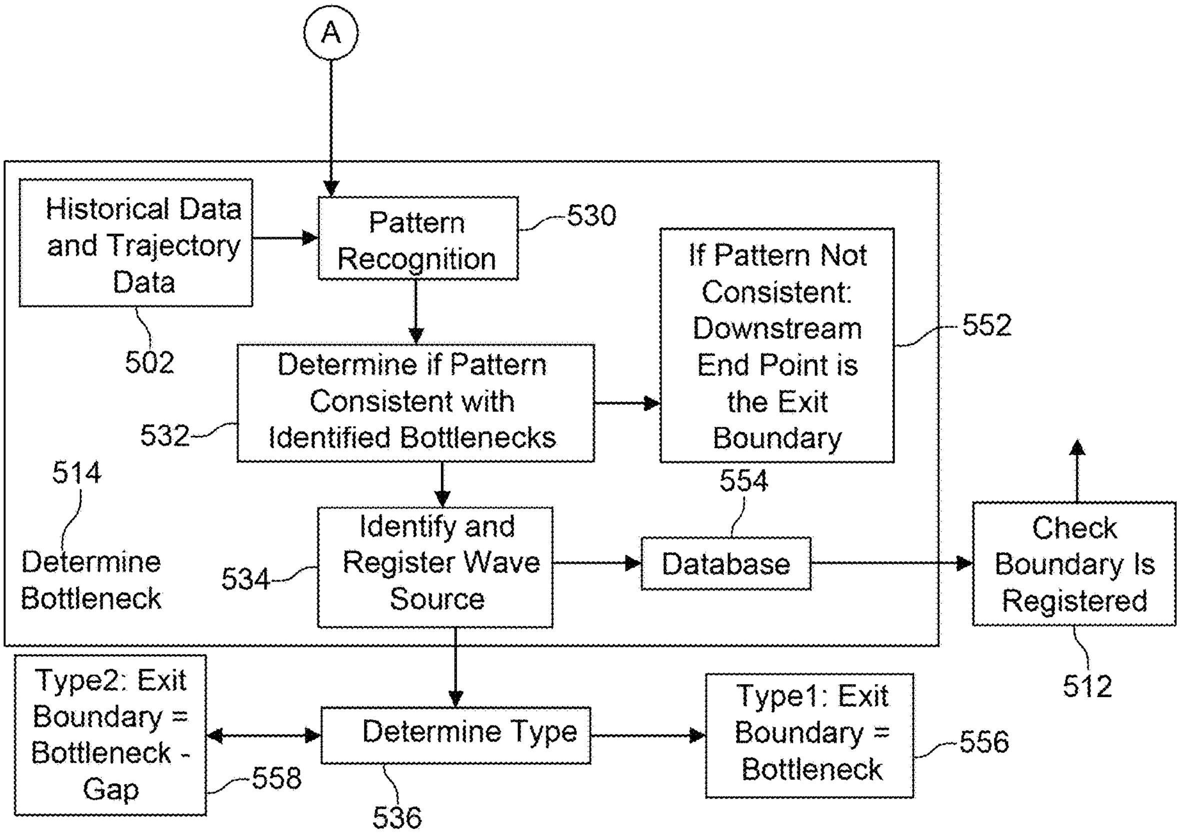

FIG. 5A illustrates an example cloud-computing system in accordance with various embodiments described herein. At block 502, the system can receive trajectory data from a control vehicle. The trajectory data may comprise the data illustrated in FIG. 4. A trajectory can be established for each of a plurality of vehicles. The data may comprise data on any vehicle's position, velocity, time, or anything regarding a particular vehicle's driving. The data can be updated periodically based on a constant time measurement.

At block 506, the trajectory data can be used for map formation. This map can display a particular vehicle's position or velocity over time, such that the control vehicle can be identified on the map. This identification may comprise the control vehicle's speed, location, and/or the projected path of the control vehicle. For example, the system can use a series of GPS records and project them on a road network.

At block 508, end points of a control zone can be determined based on the map. This control zone can represent the area where mitigation strategies are applied, such that when future vehicles enter the control zone, mitigation strategies can be activated. These end points can be determined based on any event that starts and/or ends a stop-and-go wave. Events determining the start of a control zone can comprise a vehicle changing lanes, an accident, construction, or any other features that can affect traffic. Events determining the end of a control zone can comprise vehicles traveling at a constant or similar speed, the end of an accident or construction zone, or a location where the traffic-causing event is not affected. The end points may also be determined based on particular vehicles, such that the control zone shifts with the affected vehicles.

At block 510, the stop-and-go waves are determined in this control zone. These waves can be determined based on pattern recognition algorithms that can recognize the patterns as illustrated in FIG. 4. The pattern recognition algorithms can determine stop-and-go waves based on the trends in position and velocity. As an example, the control vehicle may decelerate every forty-five seconds, suggesting that a new stop-and-go wave is occurring every 45 seconds. The algorithms can evaluate the control vehicle's position and/or velocity over time to determine the phases of stop-and-go waves as illustrated in FIG. 4. If there are no stop-and-go waves, the system can refrain from activating mitigation strategies.

At block 512, the system can determine whether enter and exit boundaries are registered for the control zone based on the stop-and-go waves, as described below in FIG. 5B. As described above, the control zone can represent the area where mitigation strategies are applied, such that when future vehicles enter the control zone, mitigation strategies can be activated. The enter and exit boundaries illustrate the point at which the control vehicle activates and deactivates mitigation strategies. The system can determine if boundaries are registered and register and/or update boundaries based on the stop-and-go waves. These boundaries can be periodically updated or updated after events that affect stop-and-go waves.

At block 520, the system can register the enter boundary or update the enter boundary if one is already present. The enter boundary can be set based on the maximum wavelength 538 of the stop-and-go waves identified at block 510. This maximum wavelength can comprise the maximum distance a vehicle travels during a stop-and-go wave. The enter boundary can be defined 540 as the upstream end point (i.e., the rear bumper of the last vehicle in a stop-and-go wave) minus the distance of the maximum wavelength. This can provide the control vehicle with enough distance to mitigate stop-and-go waves before encountering one itself.

At block 522, the system can determine if an exit boundary is registered. An exit boundary may already be registered or stored if the control vehicle has been traveling in the control zone for enough time to experience at least one stop-and-go wave. An exit boundary is likely not registered if the control vehicle has just entered the control zone. If an exit boundary is registered, the system can determine if a bottleneck has been identified at block 524. If no bottlenecks exist at block 548, the exit boundary can be set 550 as the downstream end point (i.e. the front bumper of the first vehicle experiencing stop-and-go waves.) If a bottleneck is present, the exit boundary can remain as previously determined by the bottleneck.

If an exit boundary has not been registered, the system can determine if there are bottlenecks present near the downstream end point at block 526. If there are no bottlenecks present at block 542, the system can set the downstream end point 544 as the exit boundary as mentioned above. If there are bottlenecks present, the system can proceed to pattern recognition 546 as part of determining the bottlenecks.

At block 514, the system can determine if there are bottlenecks present. Bottlenecks can comprise events or objects that create stop-and-go waves. Example bottlenecks include traffic signals, ramp meters, highway merges, stop signs, and rubbernecking events. These bottlenecks can affect the location of the exit boundaries as passing these events or objects can release the control vehicle from stop-and-go waves. There can be two types of bottlenecks: 1) bottlenecks that fix the departure time of a vehicle in the bottleneck regardless of arrival time (such as fixed-time ramp metering) and 2) bottlenecks with departure times that can be altered by the arrival time of the vehicle (such as stop signs, tolls, or parking booths). The system can determine the type of bottleneck based on the trends in the stop-and-go waves.

At block 530, the system can apply pattern recognition algorithms as used to determine the presence of stop-and-go waves. These pattern recognition algorithms can identify whether the observed pattern in the waves is consistent with historical patterns for the identified bottleneck. These algorithms can apply the trajectory data 502 from the control vehicle with historical data on vehicle movement during a particular bottleneck to determine if the pattern is consistent with the identified bottleneck at block 532. If the pattern is not consistent, the system may not confirm the identified bottleneck and set the exit boundary 552 as the downstream end point as if there were no bottlenecks present.

If the pattern is consistent, the system can identify and register the wave source at block 534. For example, the system can identify a ramp meter as the source based on the patterns identified in the stop-and-go waves. If stop-and-go waves do not occur after vehicles pass the ramp meter, the system can determine that the ramp meter is the wave source. This information can be stored in a database 554 that can be accessed by the control vehicle or other vehicles that may encounter the identified stop-and-go waves. By storing the information, future vehicles will not need to identify the wave source of the stop-and-go waves. Once the information is stored, the system can check again if the boundary is registered by repeating the processes described in block 512 and 514. This allows the system to update the exit and enter boundaries based on the stop-and-go waves.

At block 536, the system can determine the type of bottleneck. If the bottleneck is a Type 1 bottleneck, i.e. bottlenecks that fix the departure time of a vehicle in the bottleneck regardless of arrival time, the exit boundary can be set 556 as the location of the bottleneck. If the bottleneck is a Type 2 bottleneck, i.e. bottlenecks with departure times that can be altered by the arrival time of the vehicle, the exit boundary can be set 558 as the bottleneck location minus a determined gap.

Figure 5B:
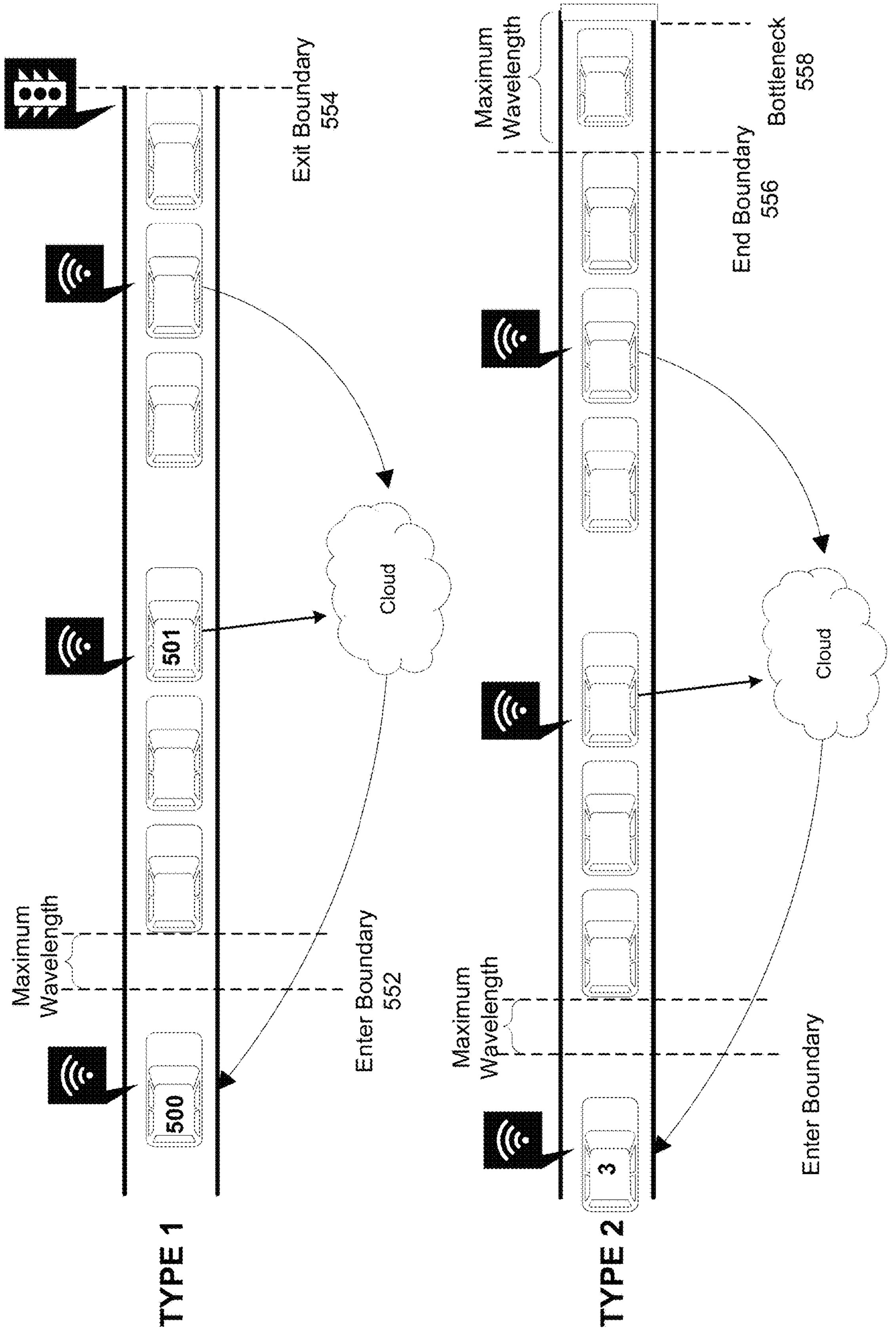
FIG. 5B illustrates an example system for Type 1 and Type 2 bottlenecks in accordance with various embodiments.

FIG. 5B illustrates the exit boundaries as set by each type of bottleneck. For both types of bottlenecks, the enter boundary 552 can be set as the upstream end point minus the maximum wavelength of a stop-and-go wave as described above. For a Type 1 bottleneck, the exit boundary 554 can be set as the location of the bottleneck, illustrated by a traffic light in FIG. 5B. Vehicle 500 can receive information from the cloud system that the exit and enter boundaries should be set accordingly, allowing vehicle 500 to activate mitigation strategies at the enter boundary. The cloud system can also receive information from other vehicles (e.g. vehicle 501) which can use the information for determining stop-and-go waves and the corresponding bottlenecks. For a Type 2 bottleneck, the enter boundary can be the same as described for Type 1 bottlenecks. The exit boundary 556 can be set as one wavelength before the location of bottleneck 558. This can allow vehicles to arrive at the location of the bottleneck without delay.

The control vehicle can activate mitigation strategies once it passes the enter boundary into the control zone. As mentioned above, mitigation strategies may comprise maintaining the control vehicle at a reference speed to avoid further stop-and-go waves. This reference speed can be determined based on different situations causing the stop-and-go traffic as described below.

Case 1: Bottleneck with Fixed Departure Times and Fixed Cycles

In some cases, the bottleneck has a fixed departure time and fixed cycle, such as a fixed-time ramp meter. Information on these bottlenecks can come from infrastructure data that identifies the location of the bottleneck and the time periods involved in a ramp meter's cycle. Infrastructure data can comprise ramp meter detectors, traffic light monitoring, toll booth actuation, construction data, or any other information on road infrastructure. In this case, trajectory data is not needed to determine a reference speed. Rather, the system determines parameters based on the infrastructure data. These parameters can include cycle length or the number of vehicles discharged in each cycle. This data may be obtained in real-time or may be stored in a database. The distance traveled in each cycle can be calculated by $$\lambda_{sg}=n^*(L+s_0)$$

where n is the number of vehicles discharged in each cycle, L is the length of the discharged vehicle, and $s_0$ is the minimum distance between vehicles while stopped. In this case, the total time period $T_{sg}$ of each stop-and-go wave can be estimated as the cycle length. Therefore, the reference speed can be calculated as $$v_d = \frac{\lambda_{sg}}{T_{sg}}$$

Therefore, the control vehicle can operate at this reference speed to avoid stop-and-go waves at a fixed departure and cycle time.

Case 2: Bottlenecks with Fixed Departure Times and Varying Cycles

In some cases, the bottlenecks have a fixed departure time and varying cycles. These varying cycle lengths can be bounded by minimum and maximum values. One strategy for the reference speed would be to apply the same formulas as in case 1 but using the maximum cycle length as the time period. This can be set as an initial reference speed that can be updated as more information is gathered on the cycles. Therefore, this initial reference speed can be calculated as $$v_d = \frac{\lambda_{sg}}{C_{max}}$$

To prevent the control vehicle from missing the phase where vehicles are discharged, the last velocity can be calculated as the distance the control vehicle needs to travel to reach or surpass the ramp or other bottleneck divided by the minimum cycle length. This way, the vehicle is not too slow as to miss the last cycle.

In some cases, signal cycle data is available. For example, in some adaptive traffic signals, the internal signal system can find the optimal value for the next cycle and store information on the next phase duration. This information may be accessible as part of the received infrastructure data. In this case, the initial reference speed can be determined as described above. However, the last speed can differ because the system has accurate data as to the phase duration. Therefore, the last speed can be the distance to travel divided by the phase duration of the bottleneck.

Case 3: Bottlenecks with Fixed Waiting Time

In some cases, the bottlenecks have a fixed waiting time, such as stop-control intersections, highway tolls, parking tolls, and rubbernecking. This means that every vehicle waits the same amount of time before being discharged from the bottleneck (i.e. three seconds at a stop-controlled intersection). The cycle time in these situations can be the sum of the delay time, i.e. the time it takes for the next vehicle to arrive after the first vehicle departs, and the waiting time, i.e. the time the vehicle processes at the bottleneck before departure. These time periods can be estimated from real-time or historical trajectory data or by infrastructure detectors such as ramp detectors, traffic signal detectors, etc. Further examples of these can include loop detectors, cameras, and roadside units. Based on historical data, the system can generate a prediction model to predict waiting times or, alternatively, update waiting times based on real-time data. Using this new cycle length, the same formula can be applied as in case 1.

Case 4: Cloud Data with Real-Time Trajectory Data

The cloud system may have access to a plurality of vehicle trajectories within the control zone, based on GPS data, infrastructure data, and vehicle sensor data. The data can be obtained from a plurality of connected vehicles (e.g. vehicles 500 and 501 in FIG. 5B). For example, the control vehicle can detect the trajectory of a preceding vehicle using gap detection sensors. These sensors can determine the distance between the control vehicle and the preceding vehicle as the control vehicle moves through the control zone. Another connected vehicle a few vehicles ahead may also comprise gap detection sensors to determine the trajectory of its preceding vehicle, and so on, such that the cloud system can accumulate a plurality of vehicle trajectories. The system can apply these trajectories absent infrastructure data to determine a reference speed. The reference speed can be calculated as the average speed of vehicles over the total control zone length, or $$v_d = \frac{\sum_{i=1}^{I} \lambda_{sg}^{i}}{\sum_{i=1}^{I} T_{sg}^{i}} = \frac{D}{TT}$$

where D is the total distance for all waves in the control zone (i.e., length of the control zone), and TT is the sum of the travel times for each stop-and-go wave (i.e., total time spent by a vehicle in the control zone). For cases with multiple vehicle trajectories, these values can be the average distance and time for a particular vehicle. This average can also be updated or weighted to more recent trajectories so that the reference speed is up-to-date with the current traffic situation.

Case 5: Cloud Data with Historical Trajectory Data

If real-time trajectory data is unavailable, the system may rely on historical records of vehicle trajectories. The system can receive a plurality of vehicle trajectories as described above and store those trajectories in a database. The system may continue to collect additional vehicle trajectories over time, or update the database with more recent vehicle trajectories. At a time where real-time data is unavailable (i.e. no connected vehicles in the control zone), the system can compute the reference speed based on the historical data. The system can estimate the stop-and-go waves for the historical data as well as the time period associated with those waves in accordance with any of the methods described above. In cases where the time periods for each stop-and-go wave do not vary significantly (such as in a fixed waiting time bottleneck), the reference speed can be set as the average speed throughout the control zone. Alternatively, if the time periods vary, the reference speed can be calculated as the minimum speed of the historical stop-and-go waves. This minimum speed may also be the initial speed that can be updated as the vehicle moves through the control zone with additional data collected as needed (i.e. the trajectory of the control vehicle or a preceding vehicle if gap detection sensors are implemented).

Any of the above methods can be used to determine the reference speed, even if the particular bottleneck or event varies. Any of the above methods can be implemented using infrastructure data or connected vehicle data, or may be updated using additional data as needed.

Figure 6:
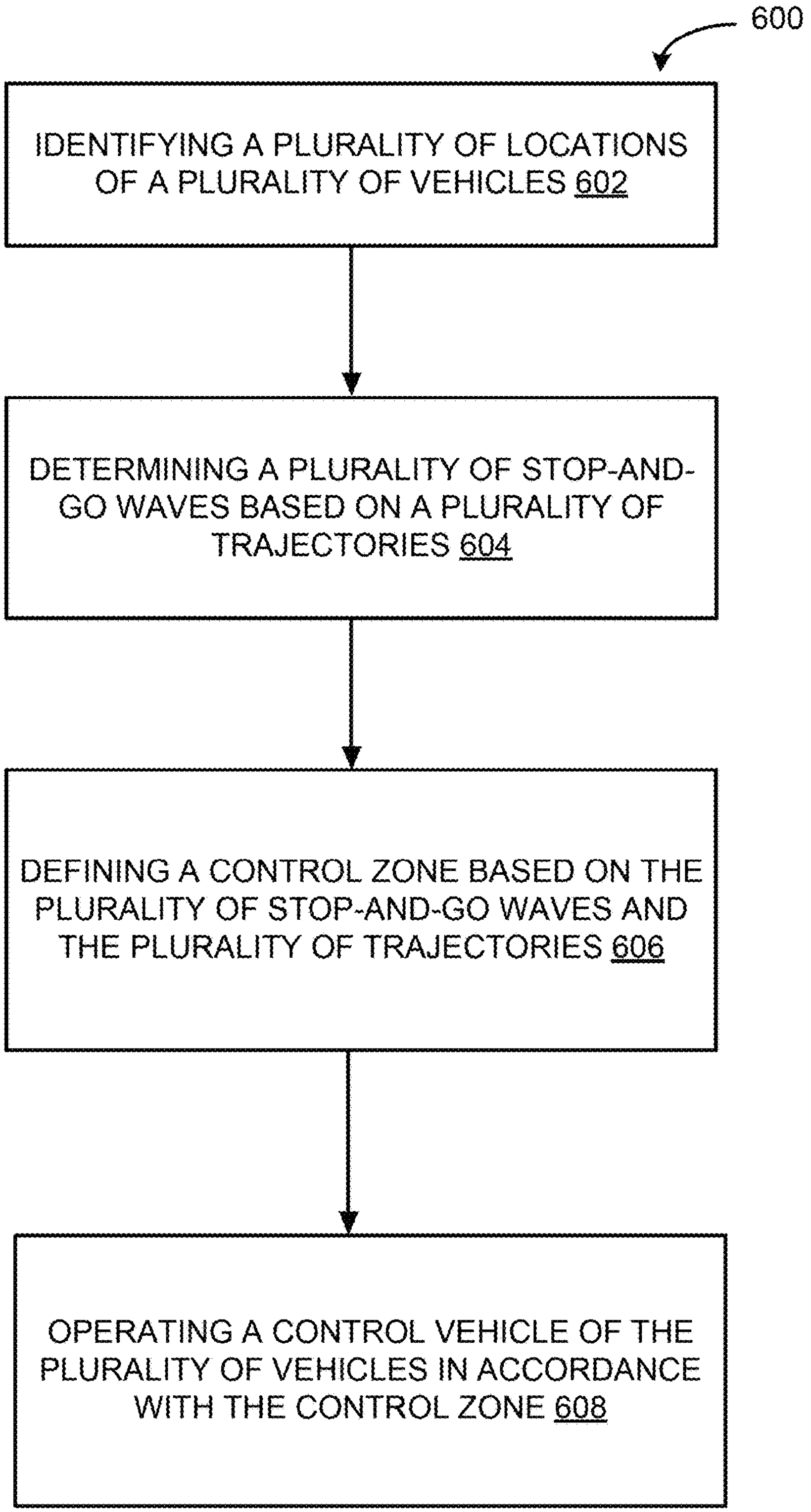
FIG. 6 illustrates an example method in accordance with various embodiments.

FIG. 6 illustrates an example method 600 that can be applied in accordance with the systems described above. At block 602, the system can identify a plurality of locations of a plurality of vehicles, wherein the plurality of vehicles are traveling in one direction on a same road, and wherein the plurality of locations is determined through communications transmitted between a control vehicle of the plurality of vehicles and one or more secondary vehicles of the plurality of vehicles or infrastructure of the same road. As described above, the system can receive data comprising any vehicle's position, velocity, time, or anything regarding a particular vehicle's driving. This data may come from sensor data of the control vehicle, infrastructure data of the environment, or connected vehicle data. The data can be updated periodically based on a constant time measurement.

At block 604, the system can determine a plurality of stop-and-go waves based on a plurality of trajectories. As described above, a trajectory can be established for each of a plurality of vehicles. This trajectory data can be used for map formation, where the map can display a particular vehicle's position or velocity over time. These waves can be determined based on pattern recognition algorithms that can recognize the patterns as illustrated in FIG. 4. The pattern recognition algorithms can determine stop-and-go waves based on the trends in position and velocity. The algorithms can evaluate the control vehicle's position and/or velocity over time to determine the phases of stop-and-go waves as illustrated in FIG. 4.

At block 606, the system can define a control zone based on the plurality of stop-and-go waves and the plurality of trajectories. As described above, this definition can comprise an enter and exit boundary as illustrated in FIG. 5B. The enter boundary can be registered as the upstream end point minus the distance of the maximum wavelength. The exit boundary can be determined based on the presence of bottlenecks. If no bottlenecks are present, the exit boundary can comprise the downstream end point. If a bottleneck is present, the exit boundary can comprise either the location of the bottleneck or the bottleneck minus a gap, where the gap can equal the maximum wavelength of stop-and-go waves experienced in the control zone.

At block 608, the system can operate the control vehicle in accordance with the control zone. As described above, the control vehicle can implement mitigation strategies based on the control zone. Mitigation strategies can comprise maintaining the vehicle at a reference speed as described in Cases 1-5. The reference speed may be determined by trajectory data, data from connected vehicles, sensor data, and/or infrastructure data.

There are various spontaneous events that can occur to cause stop-and-go waves, including, but not limited to sudden accidents, quick lane changes, sudden braking, or aggressive driving techniques. In these circumstances, a stop-and-go wave may suddenly occur, and in some cases, there is only one stop-and-go wave. Therefore, it is necessary that the control vehicle be able to react to the stop-and-go wave without processing data on a previous stop-and-go wave. The system can implement a reinforcement learning controller to damp the oscillation resulting from a sudden stop-and-go wave through one or more machine learning models that predict deceleration based on infrastructure or connected vehicle data. Applying the reinforcement learning controller, the control vehicle can experience these sudden stop-and-go waves, in real-world or in simulation, and the system can adapt and learn to predict deceleration with increasing accuracy after each sudden stop-and-go wave. The system can then predict as the event occurs, allowing the control vehicle to decelerate in advance or change speed to avoid experiencing a sudden or harsh brake.

As described above, the control zone can represent the area where mitigation strategies are applied, such that when future vehicles enter the control zone, mitigation strategies can be activated. These end points can be determined based on any event that starts and/or ends a stop-and-go wave. The end points may also be determined based on particular vehicles, such that the control zone shifts with the affected vehicles. The system may implement a control zone prior to applying a reinforcement learning model.

Figure 7:
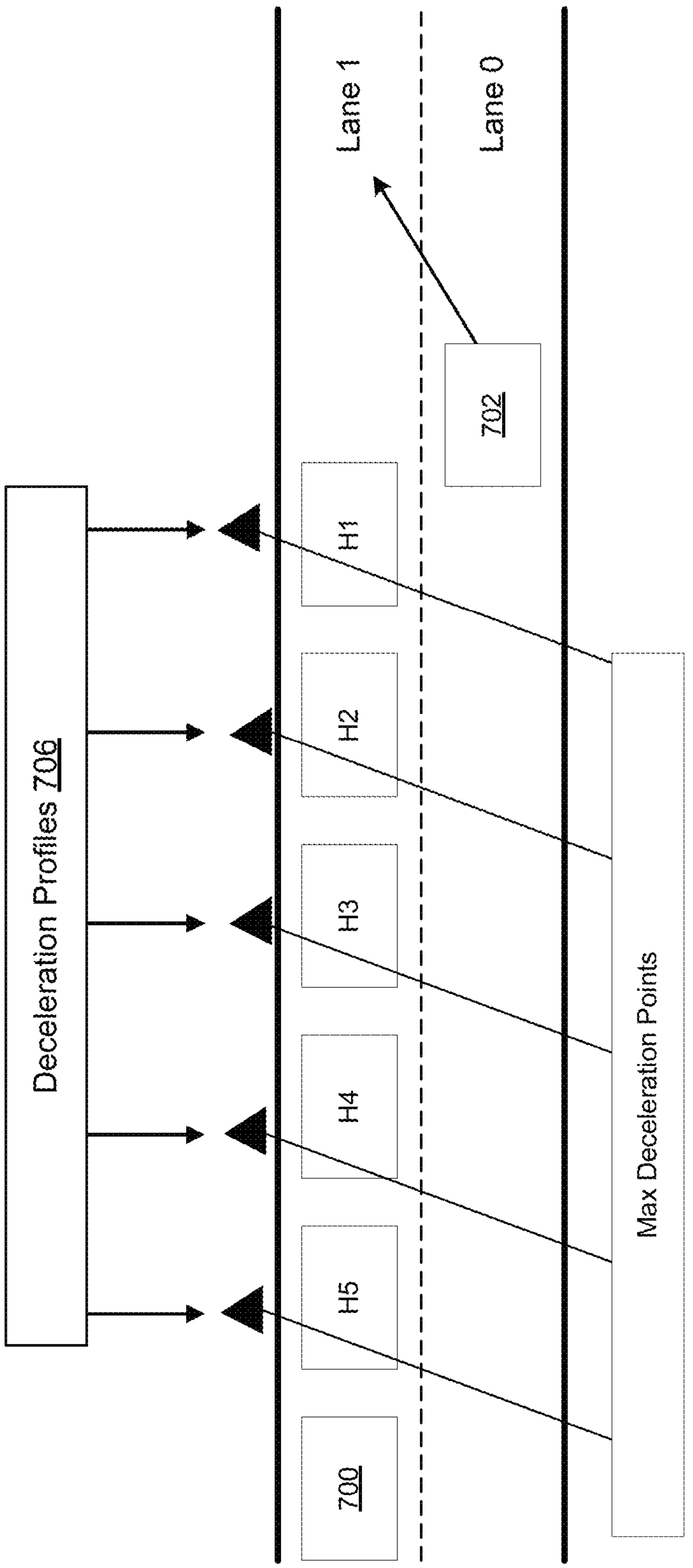
FIG. 7 illustrates an example system for determining deceleration profiles in accordance with various embodiments.

FIG. 7 illustrates an example situation for applying a reinforcement learning model. In this example, control vehicle 700 can be traveling behind vehicles H1-H5 when a new vehicle 702 suddenly changes lanes to merge into the same lane. The system can receive trajectory data from control vehicle 700 and vehicles H1-H5 through infrastructure data or connected vehicle data as described above. This data may comprise the trajectory of control vehicle 700, the speed of control vehicle 700, the density of vehicles between control vehicle 700 and vehicle 702, and/or the space between control vehicle 700 and the vehicle directly before vehicle 702 (e.g. vehicle H1 in FIG. 7). The space between control vehicle 700 and vehicle H1 can be measured by the rear bumper of vehicle H5 and the front bumper of vehicle H1. This data may be received from infrastructure detectors or from control vehicle 700 if the vehicle has sufficient gap sensors to detect all vehicles in front of it. Alternatively, if the control vehicle 700 cannot transmit enough sensor data to determine the density of vehicles, the control vehicle 700 can measure the distance between itself and vehicle H5. The system can receive the location of vehicle 702 based on GPS data or other infrastructure detectors. The system can estimate the density based on the distance between vehicle 700 and vehicle H5. All vehicles can be assigned an average velocity as data for individual vehicles may not be available in this case.

When vehicle 702 changes lanes, the system can input this data into a neural network to generate a plurality of deceleration profiles 706, with each profile corresponding to control vehicle 700 or vehicles H1-H5. Each deceleration profile may comprise data on the approximate position, velocity, or acceleration of the particular vehicle during the time of the stop-and-go wave. The deceleration may increase the farther away than vehicle is from H1, as H1 may delay braking, resulting in H2 having to brake harder, resulting in H3 braking harder than H2, and so on. By the time the stop-and-go wave reaches control vehicle 700, the predicted deceleration may be large, requiring vehicle 700 to brake extremely hard without mitigation strategies in place. The system can implement mitigation strategies to prevent this, such as by implementing a slow reference speed before the vehicle 700 experiences the stop-and-go wave, so that control vehicle 700 can brake less when experiencing the stop-and-go wave. The machine learning models may aim to minimize the deceleration of vehicle 700, such that the data collected during subsequent stop-and-go waves can train the system to implement mitigation strategies at the required time.

As described above, the neural network may output a deceleration profile for vehicle 700. The system may determine the success of that deceleration profile using a reward function calculated as $$R = v - pen_a - pen_j - pen_{drac}$$

where $pen_a$ is the penalty due to the acceleration/deceleration, $pen_j$ is the penalty associated with the jerk of the vehicle, i.e. the change in acceleration, and $pen_{drac}$ is a penalty associated with the traditional safety index in traffic oscillation scenarios which measures the minimum deceleration required to avoid a collision. Each penalty can be calculated by $$pen_a = a^2 \quad pen_j = \frac{da}{dt} \quad pen_{drac} = \frac{(v_2 - v_1)^2}{2D_{1-2}}$$

The system can train the network to find a reference speed as close to $R = v$ as possible.

Figure 8:
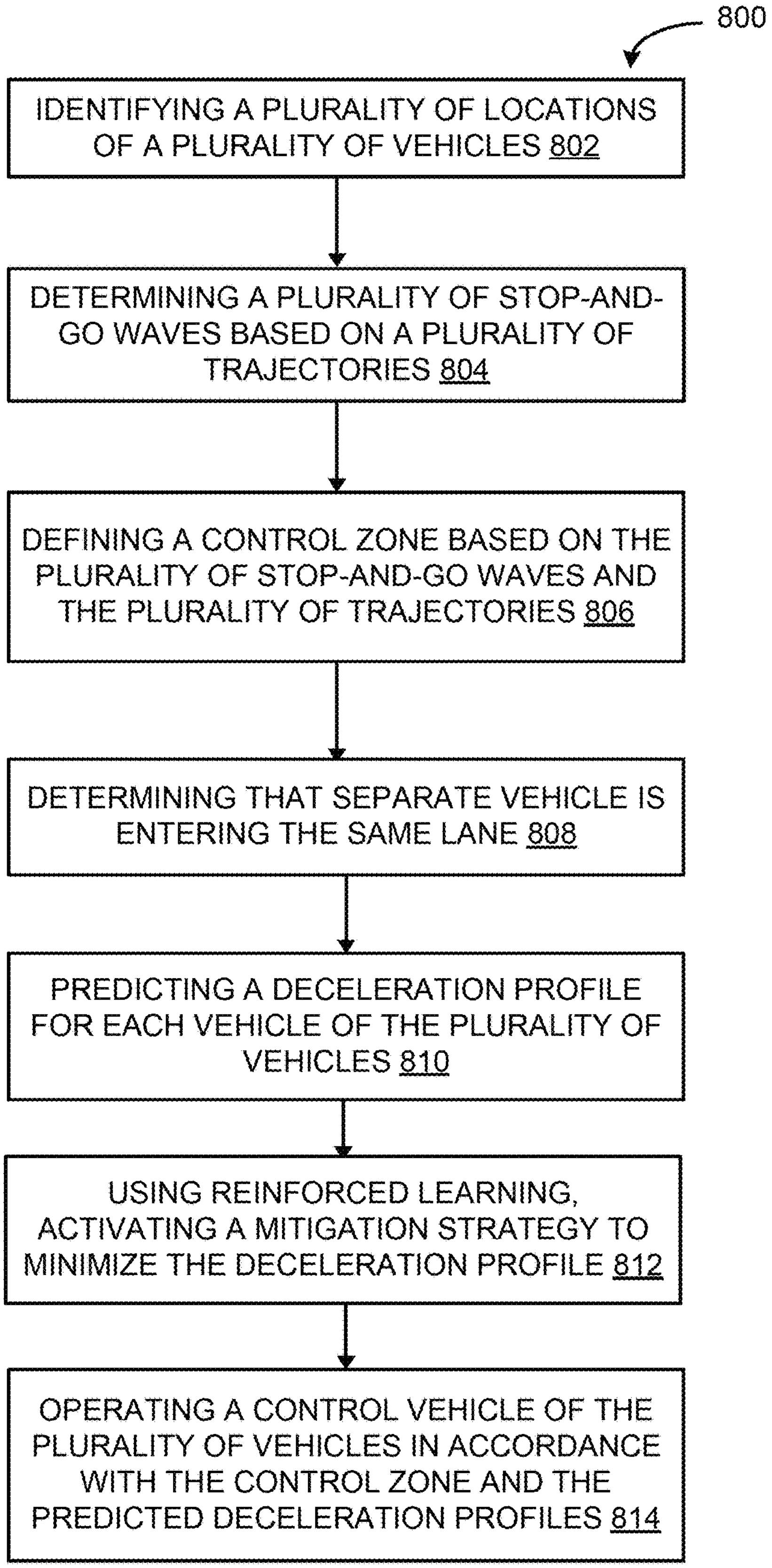
FIG. 8 illustrates an example method in accordance with various embodiments.

FIG. 8 illustrates an example method 800 for implementing the system described herein. At block 802, the system can identify a plurality of locations of a plurality of vehicles, wherein the plurality of vehicles are traveling in one direction on a same road in a same lane. As described above, the system can receive data comprising any vehicle's position, velocity, time, or anything regarding a particular vehicle's driving. The data can be updated periodically based on a constant time measurement.

At block 804, the system can determine a plurality of stop-and-go waves based on a plurality of trajectories. As described above, a trajectory can be established for each of a plurality of vehicles. This trajectory data can be used for map formation, where the map can display a particular vehicle's position or velocity over time. These waves can be determined based on pattern recognition algorithms that can recognize the patterns as illustrated in FIG. 4. The pattern recognition algorithms can determine stop-and-go waves based on the trends in position and velocity. The algorithms can evaluate the control vehicle's position and/or velocity over time to determine the phases of stop-and-go waves as illustrated in FIG. 4.

At block 806, the system can define a control zone based on the plurality of stop-and-go waves and the plurality of trajectories. As described above, this definition can comprise an enter and exit boundary as illustrated in FIG. 5B. The enter boundary can be registered as the upstream end point minus the distance of the maximum wavelength. The exit boundary can be determined based on the presence of bottlenecks. If no bottlenecks are present, the exit boundary can comprise the downstream end point. If a bottleneck is present, the exit boundary can comprise either the location of the bottleneck or the bottleneck minus a gap, where the gap can equal the maximum wavelength of stop-and-go waves experienced in the control zone.

At block 808, the system can determine that a separate vehicle is entering the same lane as the plurality of vehicles. As described above, this data may be received from infrastructure detectors or from the control vehicle if the vehicle has sufficient gap sensors to detect all vehicles in front of it. The data may comprise information on the vehicle's intent to lane change (through a lane change signal or other indication), longitudinal distance to the first vehicle of plurality of vehicles (e.g. vehicle H1 in FIG. 7), speed of the separate vehicle, and speed of the first vehicle of the plurality of vehicles. All vehicles can be assigned an average velocity as data for individual vehicles may not be available in this case.

At block 812, the system can predict a deceleration profile for each vehicle of the plurality of vehicles. As described above, when the separate vehicle changes lanes, the system can input this data into a neural network to generate a plurality of deceleration profiles. Each deceleration profile may comprise data on the approximate position, velocity, or acceleration of the particular vehicle during the time of the stop-and-go wave. The machine learning models may aim to minimize the deceleration of the control vehicle, such that the data collected during subsequent stop-and-go waves can train the system to implement mitigation strategies at the required time.

At block 812, the system can activate a mitigation strategy based on reinforcement learning to achieve a goal such as minimizing oscillations, stabilizing the traffic system, or improving the efficiency of the system. As described above, the system may incorporate one or more machine learning models that can aim to achieve the goal of the control vehicle, such that the data collected during subsequent stop-and-go waves can train the system to implement mitigation strategies at the required time. The system may determine the success of a deceleration profile using a reward function calculated as $$R=v-pen_{\alpha}-pen_{j}-pen_{drac}$$

where $pen_{\alpha}$ is the penalty due to the acceleration/deceleration, $pen_j$ is the penalty associated with the jerk of the vehicle, i.e. the change in acceleration, and $pen_{drac}$ is a penalty associated with the traditional safety index in traffic oscillation scenarios which measures the minimum deceleration required to avoid a collision. The system can train the network to find a reference speed as close to R=v as possible.

At block 814, the system can operate the control vehicle in accordance with the control zone and the predicted deceleration profiles. As described above, the control vehicle can implement mitigation strategies based on the control zone and the deceleration profiles. Mitigation strategies can comprise maintaining the vehicle at a speed based on the output of the reinforcement learning controller.

Figure 9:
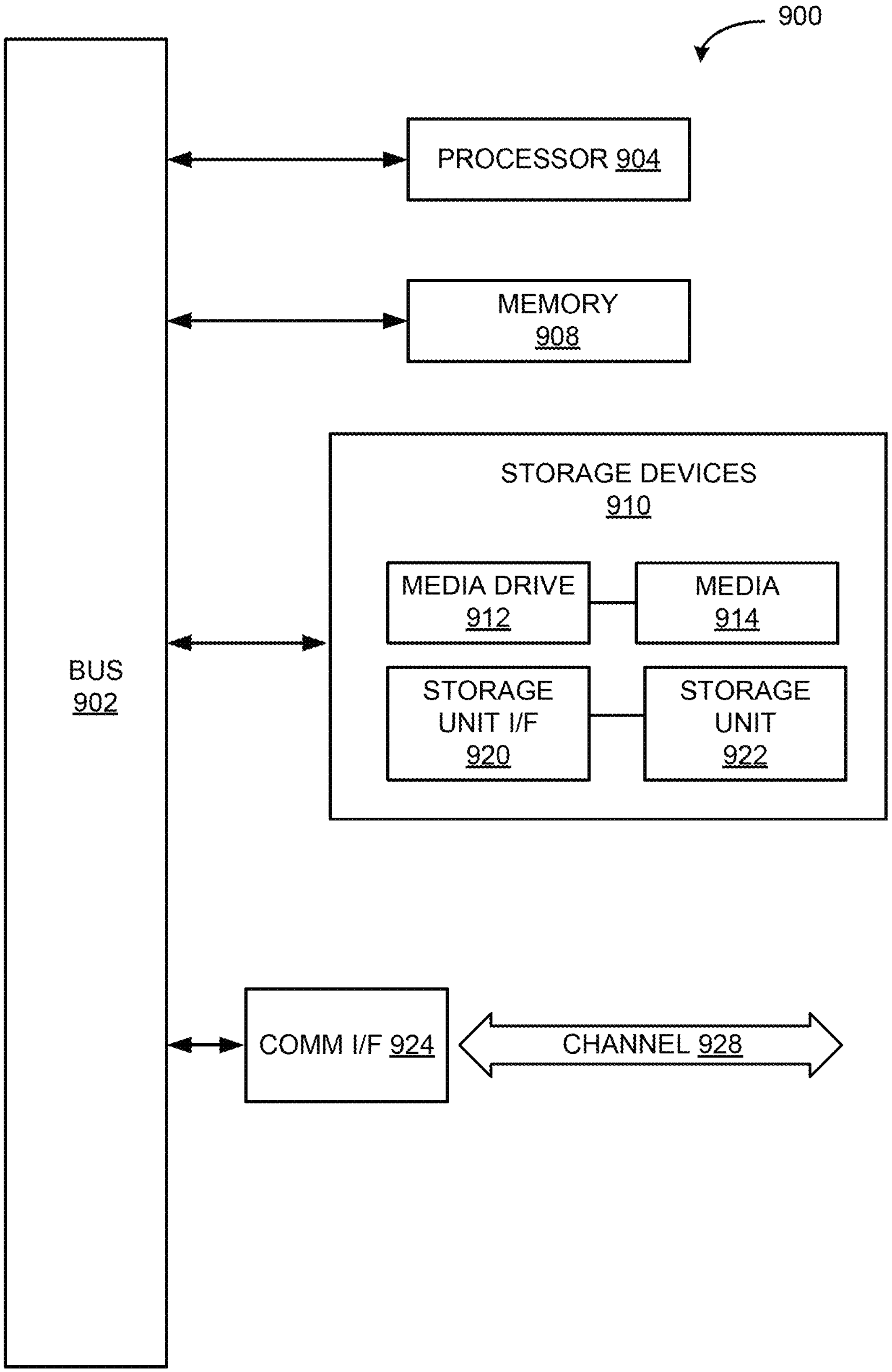
FIG. 9 is an example computing component that may be used to implement various features of embodiments described in the present disclosure.

As used herein, the terms circuit and component might describe a given unit of functionality that can be performed in accordance with one or more embodiments of the present application. As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 9. Various embodiments are described in terms of this example-computing component 900. After reading this description, it will become apparent to a person skilled in the relevant art how to implement the application using other computing components or architectures.

Referring now to FIG. 9, computing component 900 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 900 might also represent computing capabilities embedded within or otherwise available to a given device. For example, a computing component might be found in other electronic devices such as, for example, portable computing devices, and other electronic devices that might include some form of processing capability.

Computing component 900 might include, for example, one or more processors, controllers, control components, or other processing devices. Processor 904 might be implemented using a general-purpose or special-purpose processing engine such as, for example, a microprocessor, controller, or other control logic. Processor 904 may be connected to a bus 902. However, any communication medium can be used to facilitate interaction with other components of computing component 900 or to communicate externally.

Computing component 900 might also include one or more memory components, simply referred to herein as main memory 908. For example, random access memory (RAM) or other dynamic memory, might be used for storing information and instructions to be executed by processor 904. Main memory 908 might also be used for storing temporary variables or other intermediate information during execution of instructions to be executed by processor 904. Computing component 900 might likewise include a read only memory ("ROM") or other static storage device coupled to bus 902 for storing static information and instructions for processor 904.

The computing component 900 might also include one or more various forms of information storage mechanism 910, which might include, for example, a media drive 912 and a storage unit interface 920. The media drive 912 might include a drive or other mechanism to support fixed or removable storage media 914. For example, a hard disk drive, a solid-state drive, a magnetic tape drive, an optical drive, a compact disc (CD) or digital video disc (DVD) drive (R or RW), or other removable or fixed media drive might be provided. Storage media 914 might include, for example, a hard disk, an integrated circuit assembly, magnetic tape, cartridge, optical disk, a CD or DVD. Storage media 914 may be any other fixed or removable medium that is read by, written to or accessed by media drive 912. As these examples illustrate, the storage media 914 can include a computer usable storage medium having stored therein computer software or data.

In alternative embodiments, information storage mechanism 910 might include other similar instrumentalities for allowing computer programs or other instructions or data to be loaded into computing component 900. Such instrumentalities might include, for example, a fixed or removable storage unit 922 and an interface 920. Examples of such storage units 922 and interfaces 920 can include a program cartridge and cartridge interface, a removable memory (for example, a flash memory or other removable memory component) and memory slot. Other examples may include a PCMCIA slot and card, and other fixed or removable storage units 922 and interfaces 920 that allow software and data to be transferred from storage unit 922 to computing component 900.

Computing component 900 might also include a communications interface 924. Communications interface 924 might be used to allow software and data to be transferred between computing component 900 and external devices. Examples of communications interface 924 might include a modem or softmodem, a network interface (such as Ethernet, network interface card, IEEE 802.XX or other interface). Other examples include a communications port (such as for example, a USB port, IR port, RS232 port Bluetooth® interface, or other port), or other communications interface. Software/data transferred via communications interface 924 may be carried on signals, which can be electronic, electromagnetic (which includes optical) or other signals capable of being exchanged by a given communications interface 924. These signals might be provided to communications interface 924 via a channel 928. Channel 928 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 908, storage unit 920, media 914, and channel 928. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 900 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:

determining stop-and-go waves based on trajectories, of first vehicles traveling in a common direction on a road segment;

defining a control zone within the road segment based on the stop-and-go waves and the trajectories;

determining that a second vehicle is moving from a first lane to a second lane, wherein the first vehicles are traveling in the second lane;

using reinforcement learning, activating a mitigation strategy to reduce oscillation of a control vehicle of the first vehicles resulting from the stop-and-go waves; and operating the control vehicle in accordance with the mitigation strategy to reduce a quantity of the stop-and-go waves within the control zone.

2. The method of claim 1, wherein activating the mitigation strategy comprises determining a speed for the control vehicle to reduce oscillation of the control vehicle.

3. The method of claim 1, further comprising predicting a deceleration profile for each vehicle of the first vehicles based on the second vehicle and operating the control vehicle in accordance with the deceleration profiles.

4. The method of claim 3, wherein predicting the deceleration profile for each vehicle of the first vehicles comprises receiving information from the second vehicle on at least one of intent to lane change, longitudinal distances between the first vehicles, speed of the second vehicle, and speeds of the first vehicles.

5. The method of claim 4, wherein predicting the deceleration profile for each vehicle of the first vehicles comprises inputting the information from the second vehicle to a neural network and receiving a deceleration profile for each vehicle of the first vehicles based on the information.

6. The method of claim 3, further comprising determining a maximum deceleration for each deceleration profile.

7. The method of claim 1, further comprising:
selecting a stop-and-go wave of the stop-and-go waves with a maximum wavelength; and
setting an entrance boundary for the control zone based on the maximum wavelength.

8. The method of claim 7, further comprising setting an exit boundary at a location of the second vehicle or a maximum wavelength behind the second vehicle.

9. The method of claim 8, further comprising deactivating the mitigation strategy when the control vehicle reaches the exit boundary.

10. The method of claim 1, wherein the mitigation strategy is based on infrastructure bottleneck data.

11. The method of claim 1, wherein the mitigation strategy is based on the trajectories.

12. The method of claim 11, wherein the trajectories are determined based on at least one of real-time vehicle data and historical data.

13. The method of claim 11, wherein the trajectories are determined based on data received from at least one vehicle of the first vehicles, wherein the at least one vehicle is communicatively connected to the control vehicle.

14. A cloud-based system, comprising:
one or more processors; and
memory coupled to the one or more processors to store instructions, which when executed by the one or more processors, cause the cloud-based system to:
determine stop-and-go waves based on trajectories, first vehicles traveling in a first lane of a road segment;
define a control zone within the road segment based on the stop-and-go waves and the trajectories;
determine that a second vehicle is entering the first lane;
input information from the second vehicle to a neural network and receive a deceleration profile for each vehicle of the first vehicles based on the information; and
operate a control vehicle in accordance with the control zone and the deceleration profiles to reduce a quantity of the stop-and-go waves within the control zone.

15. The cloud-based system of claim 14, wherein the instructions further cause the cloud-based system to receive information from the second vehicle on at least one of intent to lane change, longitudinal distances between the first vehicles, speed of the second vehicle, and speeds of the first vehicles.

16. The cloud-based system of claim 14, wherein the instructions further cause the cloud-based system to:
select a stop-and-go wave of the stop-and-go waves with a maximum wavelength; and
set an entrance boundary for the control zone based on the maximum wavelength.

17. The cloud-based system of claim 16, wherein the instructions further cause the cloud-based system to set an exit boundary at a location of the second vehicle or a maximum wavelength behind the second vehicle.

18. The cloud-based system of claim 17, wherein the instructions further cause the processor to deactivate the operation of the control vehicle in accordance with the control zone and the deceleration profiles when the control vehicle reaches the exit boundary.

19. The cloud-based system of claim 14, wherein the instructions further cause the cloud-based system to determine a maximum deceleration for each deceleration profile.

20. The cloud-based system of claim 14, wherein operation of the control vehicle in accordance with the control zone and the deceleration profiles is based on the trajectories.

* * * * *